(12) United States Patent
Pouran Ben Veyseh et al.

(10) Patent No.: US 12,321,703 B2
(45) Date of Patent: Jun. 3, 2025

(54) GENERATIVE MODEL FOR ASPECT TERM EXTRACTION

(71) Applicant: ADOBE INC., San Jose, CA (US)

(72) Inventors: Amir Pouran Ben Veyseh, Eugene, OR (US); Franck Dernoncourt, San Jose, CA (US)

(73) Assignee: ADOBE INC., San Jose, CA (US)

( * ) Notice: Subject to any disclaimer, the term of this patent is extended or adjusted under 35 U.S.C. 154(b) by 534 days.

(21) Appl. No.: 17/650,177

(22) Filed: Feb. 7, 2022

(65) Prior Publication Data

US 2023/0252237 A1 Aug. 10, 2023

(51) Int. Cl.
G06F 40/289 (2020.01)
G06F 40/35 (2020.01)
G06N 3/08 (2023.01)

(52) U.S. Cl.
CPC ............ *G06F 40/289* (2020.01); *G06F 40/35* (2020.01); *G06N 3/08* (2013.01)

(58) Field of Classification Search
CPC ......... G06F 40/289; G06F 40/35; G06N 3/08; G06N 7/01; G06N 3/0442; G06N 3/0455; G06N 3/0475; G06N 3/088; G06N 3/09; G06N 3/092
See application file for complete search history.

(56) References Cited

U.S. PATENT DOCUMENTS

| | | | |
|---|---|---|---|
| 11,657,307 B1 * | 5/2023 | Bodapati | G06N 20/00 706/15 |
| 2019/0327501 A1 * | 10/2019 | Walters | G06F 9/547 |
| 2020/0089765 A1 * | 3/2020 | Jayaraman | G06N 3/084 |
| 2021/0141863 A1 * | 5/2021 | Wu | G06N 3/08 |
| 2021/0334459 A1 * | 10/2021 | Dvijotham | G06F 40/284 |
| 2021/0334994 A1 * | 10/2021 | Park | G06T 7/593 |
| 2021/0357867 A1 * | 11/2021 | Walker | G06Q 10/1053 |
| 2022/0012565 A1 * | 1/2022 | Hansen | G06N 3/044 |
| 2022/0027570 A1 * | 1/2022 | Kohli | G06N 3/044 |
| 2022/0138433 A1 * | 5/2022 | Divakaran | G06N 3/045 704/9 |
| 2022/0164600 A1 * | 5/2022 | Cheng | G06V 30/19147 |
| 2022/0180065 A1 * | 6/2022 | Liu | G06N 3/08 |

(Continued)

OTHER PUBLICATIONS

Kobayashi, S. (2018). Contextual augmentation: Data augmentation by words with paradigmatic relations. arXiv preprint arXiv: 1805.06201. (Year: 2018).*

(Continued)

*Primary Examiner* — Bhavesh M Mehta
*Assistant Examiner* — Philip H Lam
(74) *Attorney, Agent, or Firm* — F. CHAU & ASSOCIATES, LLC

(57) ABSTRACT

Systems and methods for natural language processing are described. Embodiments of the present disclosure receive an input phrase including an aspect term; generate a complement phrase based on the input phrase using a language generator model, wherein the complement phrase includes different words than the input phrase; combine a representation of the input phrase and a representation of the complement phrase to obtain an augmented representation of the input phrase; and generate sentiment information corresponding to the aspect term based on the augmented representation.

20 Claims, 13 Drawing Sheets

(56) References Cited

U.S. PATENT DOCUMENTS

| | | | |
|---|---|---|---|
| 2022/0215159 A1* | 7/2022 | Qian | G06F 40/40 |
| 2023/0083512 A1* | 3/2023 | Newman | G06N 3/045 |
| | | | 704/9 |

OTHER PUBLICATIONS

Wu, X., Lv, S., Zang, L., Han, J., Hu, S. (2019). Conditional BERT Contextual Augmentation. In: Rodrigues, J., et al. Computational Science—ICCS 2019. ICCS 2019. Lecture Notes in Computer Science( ), vol. 11539. Springer, Cham. https://doi.org/10.1007/978-3-030-22747-0_7 (Year: 2019).*

Li, K., Chen, C., Quan, X., Ling, Q., & Song, Y. (2020). Conditional augmentation for aspect term extraction via masked sequence-to-sequence generation. arXiv preprint arXiv:2004.14769. (Year: 2020).*

He, R., Lee, W. S., Ng, H. T., & Dahlmeier, D. (Jul. 2017). An unsupervised neural attention model for aspect extraction. In Proceedings of the 55th Annual Meeting of the Association for Computational Linguistics (vol. 1: Long Papers) (pp. 388-397). (Year: 2017).*

Wang, K., & Wan, X. (Aug. 2021). TransSum: Translating aspect and sentiment embeddings for self-supervised opinion summarization. In Findings of the Association for Computational Linguistics: ACL-IJCNLP 2021 (pp. 729-742). (Year: 2021).*

Sun, J., Han, P., Cheng, Z., Wu, E., & Wang, W. (2020). Transformer based multi-grained attention network for aspect-based sentiment analysis. IEEE Access, 8, 211152-211163. (Year: 2020).*

Rao, G., Gu, X., Feng, Z., Cong, Q., & Zhang, L. (Jul. 2021). A Novel Joint Model with Second-Order Features and Matching Attention for Aspect-Based Sentiment Analysis. In 2021 International Joint Conference on Neural Networks (IJCNN) (pp. 1-8). IEEE. (Year: 2021).*

Banerjee, et al., "METEOR: An Automatic Metric for MT Evaluation with Improved Correlation with Human Judgments", In Proceedings of the ACL Workshop on Intrinsic and Extrinsic Evaluation Measures for Machine Translation and/or Summarization, 2005, pp. 65-72.

Chen, et al., "Enhancing Aspect Term Extraction with Soft Prototypes", In Proceedings of the 2020 Conference on Empirical Methods in Natural Language Processing (EMNLP), pp. 2107-2117, Online. Association for Computational Linguistics, 2020a.

Devlin, et al., "BERT: Pre-training of Deep Bidirectional Transformers for Language Understanding", In Proceedings of the 2019 Conference of the North American Chapter of the Association for Computational Linguistics: Human Language Technologies, vol. 1 (Long and Short Papers), pp. 4171-4186, Minneapolis, Minnesota. Association for Computational Linguistics; arXiv preprint arXiv:1810.04805v2 [cs.CL] May 24, 2019.

Lewis, et al., "BART: Denoising Sequence-to-Sequence Pre-training for Natural Language Generation, Translation, and Comprehension", arXiv:1910.13461v1 [cs.CL] Oct. 29, 2019, 10 pages.

Li, et al., "Conditional Augmentation for Aspect Term Extraction via Masked Sequence-to-Sequence Generation", In Proceedings of the 58th Annual Meeting of the Association for Computational Linguistics, pp. 7056-7066, Online. Association for Computational Linguistics, 2020.

Pennington, et al., "GloVe: Global Vectors for Word Representation", In Proceedings of the 2014 conference on empirical methods in natural language processing (EMNLP), pp. 1532-1543, 2014.

Radford, et al., "Language Models are Unsupervised Multitask Learners", OpenAI blog, 1(8):9, 2019, 24 pages.

Raffel, et al., "Exploring the Limits of Transfer Learning with a Unified Text-to-Text Transformer", arXiv preprint arXiv:1910.10683v2 [cs.LG] Oct. 24, 2019, 53 pages.

Vedantam, et al., "CIDEr: Consensus-based Image Description Evaluation", In Proceedings of the IEEE conference on computer vision and pattern recognition, pp. 4566-4575, arXiv preprint arXiv:1411.5726v2 [cs.CV] Jun. 3, 2015.

Williams, "Simple Statistical Gradient-Following Algorithms for Connectionist Reinforcement Learning", In Kluwer Academic, Machine Learning, 8, 229-256 (1992).

Xu, et al., "Double Embeddings and CNN-based Sequence Labeling for Aspect Extraction", In Proceedings of the 56th Annual Meeting of the Association for Computational Linguistics (vol. 2: Short Papers), pp. 592-598, 2018, Melbourne, Australia. Association for Computational Linguistics.

* cited by examiner

GENERATIVE MODEL FOR ASPECT TERM EXTRACTION

BACKGROUND

The following relates generally to natural language processing, and more specifically to aspect term extraction.

Natural language processing (NLP) refers to techniques for using computers to interpret natural language (i.e., language as spoken by humans). In some cases, NLP tasks involve assigning annotation data such as grammatical information to words or phrases within a natural language expression. A variety of machine learning algorithms have been applied to NLP tasks.

Aspect term extraction (ATE) is an NLP task that involves recognizing an aspect term from an input sentence that expresses a sentiment opinion. Sentiment analysis is an NLP task that involves predicting sentiment polarity (e.g., positive or negative feelings) reflected by an input sentence towards a specific aspect (e.g., an aspect term) identified in the input sentence. Sentiment analysis systems have used machine learning models to compute feature vectors for sentiment prediction.

However, conventional sentiment analysis systems sometimes fail to identify a target aspect term in a text due to limited training data. For example, conventional sentiment analysis systems often make inaccurate predictions because they are not trained on sufficient aspect term patterns. Therefore, there is a need in the art for improved sentiment analysis systems that can generate additional complement sentences for training a machine learning model based on original sentences in the training dataset and efficiently recognize uncommon aspect terms in input sentences.

SUMMARY

The present disclosure describes systems and methods for natural language processing. One or more embodiments of the disclosure provide a sentiment analysis apparatus trained to generate a probability distribution over a set of sentiments toward an aspect term. The sentiment analysis apparatus includes a language generator model and an aspect term extraction model. In some examples, the language generator model generates a complement phrase based on an input phrase. The aspect term extraction model generates sentiment information corresponding to an aspect term in the input phrase based on the complement phrase and the input phrase. In some examples, the complement phrase includes different words than the input phrase. The complement phrase includes statements about the same target aspect term as the input phrase. Accordingly, the aspect term extraction model is exposed to sufficient aspect term patterns during training. Additionally, the trained sentiment analysis apparatus can be used to transmit sentiment information and predict the sentiment of the input phrase toward the aspect term.

A method, apparatus, and non-transitory computer readable medium for natural language processing are described. One or more embodiments of the method, apparatus, and non-transitory computer readable medium include receiving an input phrase including an aspect term; generating a complement phrase based on the input phrase using a language generator model, wherein the complement phrase includes different words than the input phrase; combining a representation of the input phrase and a representation of the complement phrase to obtain an augmented representation of the input phrase; and generating sentiment information corresponding to the aspect term based on the augmented representation.

A method, apparatus, and non-transitory computer readable medium for training a neural network are described. One or more embodiments of the method, apparatus, and non-transitory computer readable medium include training an aspect term extraction model using a training set comprising an input phrase and ground truth sentiment information for the input phrase; generating a complement phrase corresponding to the input phrase based at least in part on an output of the aspect term extraction model, wherein the complement phrase includes different words than the input phrase; combining a representation of the input phrase and a representation of the complement phrase to obtain an augmented representation of the input phrase; and updating parameters of the aspect term extraction model based on the augmented representation.

An apparatus and method for natural language processing are described. One or more embodiments of the apparatus and method include a language generator model configured to generate a complement phrase based on an input phrase, wherein the complement phrase includes different words than the input phrase and an aspect term extraction model configured to generate sentiment information corresponding to an aspect term in the input phrase based on the complement phrase and the input phrase, wherein the aspect term extraction model includes a word embedding component, a sequential encoder, and a classification layer.

DETAILED DESCRIPTION

Figure 1:
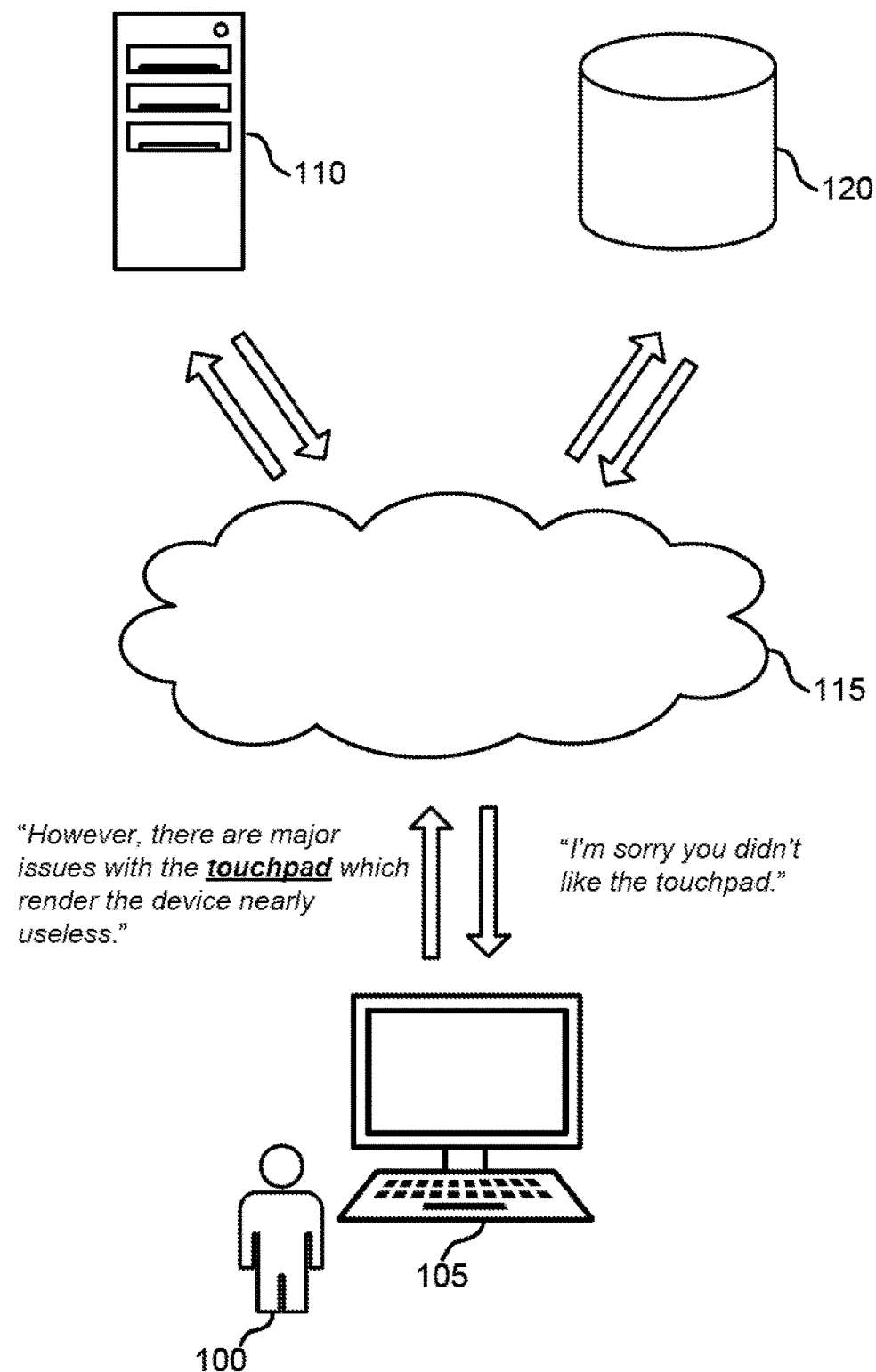
FIG. 1 shows an example of a dialog system according to aspects of the present disclosure.

The present disclosure describes systems and methods for natural language processing. One or more embodiments of the disclosure provide a sentiment analysis apparatus trained to generate a probability distribution over a set of sentiments toward an aspect term. The sentiment analysis apparatus includes a language generator model and an aspect term extraction model. In some examples, the language generator model generates a complement phrase based on an input phrase. The aspect term extraction model generates sentiment information corresponding to an aspect term in the input phrase based on the complement phrase and the input phrase. In some examples, the complement phrase includes different words than the input phrase. The complement phrase includes statements about the same target aspect term as the input phrase. Accordingly, the aspect term extraction model is exposed to sufficient aspect term patterns during training. Additionally, the trained sentiment analysis apparatus can be used to identify sentiment information and predict the sentiment of the input phrase toward the aspect term.

Aspect term extraction (ATE) is a task in aspect-based sentiment analysis (ABSA) involving recognizing an aspect term from an input phrase that expresses a sentiment opinion. That is, aspect term extraction systems can recognize an aspect term in the input phrase and indicate a sentiment opinion that the author expresses in the input phrase toward the aspect term. The opinion may be positive, negative, or neutral. For example, an input phrase states "The staff of the restaurant were good but the quality of the food was terrible". In this example, aspect term extraction systems recognize two aspect terms, i.e., "staff" and "quality of food". Sentiment analysis models can then predict a sentiment of the input phrase toward the aspect term. In some cases, aspect terms are also referred to as targets or target phrases.

Some sentiment analysis systems are trained on labeled datasets customized for aspect term extraction tasks to perform sentiment prediction. However, labeling data is costly and these systems are often trained on insufficient training data. As a result, conventional aspect term extraction models are not exposed to abundant aspect terms patterns, leading to decreased performance. For example, semantic analysis datasets such as Res15 or Res16 include less than 2,000 training samples with 20% of the words appearing more than five times. Such a small size of training data prevents the models from accurately identifying aspect terms in input phrases, especially for tail targets (i.e., targets with few examples in the training dataset). Therefore, conventional sentiment analysis systems provide inaccurate results when input phrases include uncommon aspects terms.

One or more embodiments of the present disclosure provide a sentiment analysis apparatus that is trained to generate complement sentences based on existing training data for aspect term extraction tasks. The sentiment analysis apparatus involves a multi-step training process and first trains a base model for aspect term extraction on the training data. A training component of the sentiment analysis apparatus learns word representation vectors of an optimal complement sentence corresponding to each sentence in the training data. That is, the training component generates complement representation vectors for each sentence in the training data. The complement representation vectors are then mapped into a corresponding complement sentence. In some examples, the training component locates the corresponding complement sentence by finding words whose GloVe embeddings are closest to the complement representation vectors.

In some embodiments, a language generator network is trained to generate a complement sentence corresponding to an input phrase based on pairs of original sentences in the training dataset and complement sentences mentioned above. Lastly, the training component trains a final aspect term extraction model on the training data augmented with the complement sentences. In this way, data augmentation via generating complement sentences can expose the aspect term extraction model to additional aspect term patterns. Therefore, embodiments can efficiently recognize uncommon aspects terms (i.e., tail targets) in input sentences.

By applying the unconventional step of generating a version of the complement phrase based on an input phrase, the language generator model realizes data augmentation through producing a version of the complement phrase that has words different from the input phrase. The training component of the sentiment analysis apparatus computes a reward function to fine-tune the language generator model. In some examples, the reward function enforces similarity between a version of the complement phrase and the complement phrase; a length penalty (i.e., encourage a version of the complement phrase to have the same length as the original phrase); semantic difference between a version of the complement phrase and the original phrase.

Embodiments of the present disclosure may be used in the context of a computer dialog or question answering application. For example, a sentiment analysis network based on the present disclosure may take an input phrase including an aspect term and efficiently return sentiment information (e.g., a sentient of the input phrase toward the aspect term). Then a dialog response may be generated based on the sentiment analysis. An example application of the inventive concept in the computer dialog context is provided with reference to FIGS. 1-2. Details regarding the architecture of an example sentiment analysis apparatus are provided with reference to FIGS. 3-5. Example processes for aspect-based sentiment analysis are provided with reference to FIGS. 6-7. Example training processes are described with reference to FIGS. 8-13.

Computer Dialog Application

FIG. 1 shows an example of a dialog system according to aspects of the present disclosure. The example shown includes user 100, user device 105, sentiment analysis apparatus 110, cloud 115, and database 120. Sentiment analysis apparatus 110 is an example of, or includes aspects of, the corresponding element described with reference to FIG. 3.

In the example of FIG. 1, user 100 provides a query to the sentiment analysis apparatus 110, e.g., via user device 105 and cloud 115. The example query is "However, there are major issues with the touchpad which render the device nearly useless". In this example, "touchpad" may be recognized as an aspect term. Sentiment analysis apparatus 110 determines that the query (i.e., input phrase) indicates a negative sentiment toward the aspect term, and the dialog system responds based on sentiment information accordingly.

Sentiment analysis apparatus 110 includes a trained sentiment analysis network having a word embedding network that generates word embeddings for each word of the query.

Sentiment analysis apparatus 110 generates a complement phrase based on the query using a language generator model. The complement phrase includes different words than the input phrase (see an example in FIG. 2). Sentiment analysis apparatus 110 combines a representation of the input phrase and a representation of the complement phrase to obtain an augmented representation of the input phrase.

Based on the augmented representation of the input phrase, sentiment analysis apparatus 110 generates a probability distribution over a set of sentiments. For example, the set of sentiments may include positive sentiment, negative sentiment, and neutral sentiment. In the example above, sentiment analysis apparatus 110 predicts the sentiment of the query (i.e., input phrase) toward the aspect term ("touchpad") based on the probability distribution. Sentiment analysis apparatus 110 returns the predicted answer to user 100, e.g., via user device 105 and cloud 115. One example answer is "I'm sorry you didn't like the touchpad", based on the negative sentiment towards the touchpad.

User device 105 may be a personal computer, laptop computer, mainframe computer, palmtop computer, personal assistant, mobile device, or any other suitable processing apparatus. In some examples, user device 105 includes software that incorporates a question answering or a sentiment analysis application (e.g., a computer dialog system). In some examples, the question answering application on user device 105 may include functions of sentiment analysis apparatus 110. The question answering application may either include or communicate with the sentiment analysis apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Sentiment analysis apparatus 110 receives an input phrase including an aspect term; generates a complement phrase based on the input phrase using a language generator model, where the complement phrase includes different words than the input phrase; combines a representation of the input phrase and a representation of the complement phrase to obtain an augmented representation of the input phrase; and generates aspect information corresponding to the aspect term based on the augmented representation vector. The process of using sentiment analysis apparatus 110 is further described with reference to FIG. 2.

Sentiment analysis apparatus 110 includes a computer implemented network comprising a language generator model and an aspect term extraction model. Sentiment analysis apparatus 110 may also include a processor unit, a memory unit, an I/O module, and a training component. The training component is used to train a machine learning model (or a sentiment analysis network). Additionally, sentiment analysis apparatus 110 can communicate with the database 120 via the cloud 115. In some cases, the architecture of the sentiment analysis network is also referred to as a network or a network model. Further detail regarding the architecture of sentiment analysis apparatus 110 is provided with reference to FIGS. 3-5. Further detail regarding the operation of sentiment analysis apparatus 110 is provided with reference to FIGS. 6-7.

In some cases, sentiment analysis apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communication network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
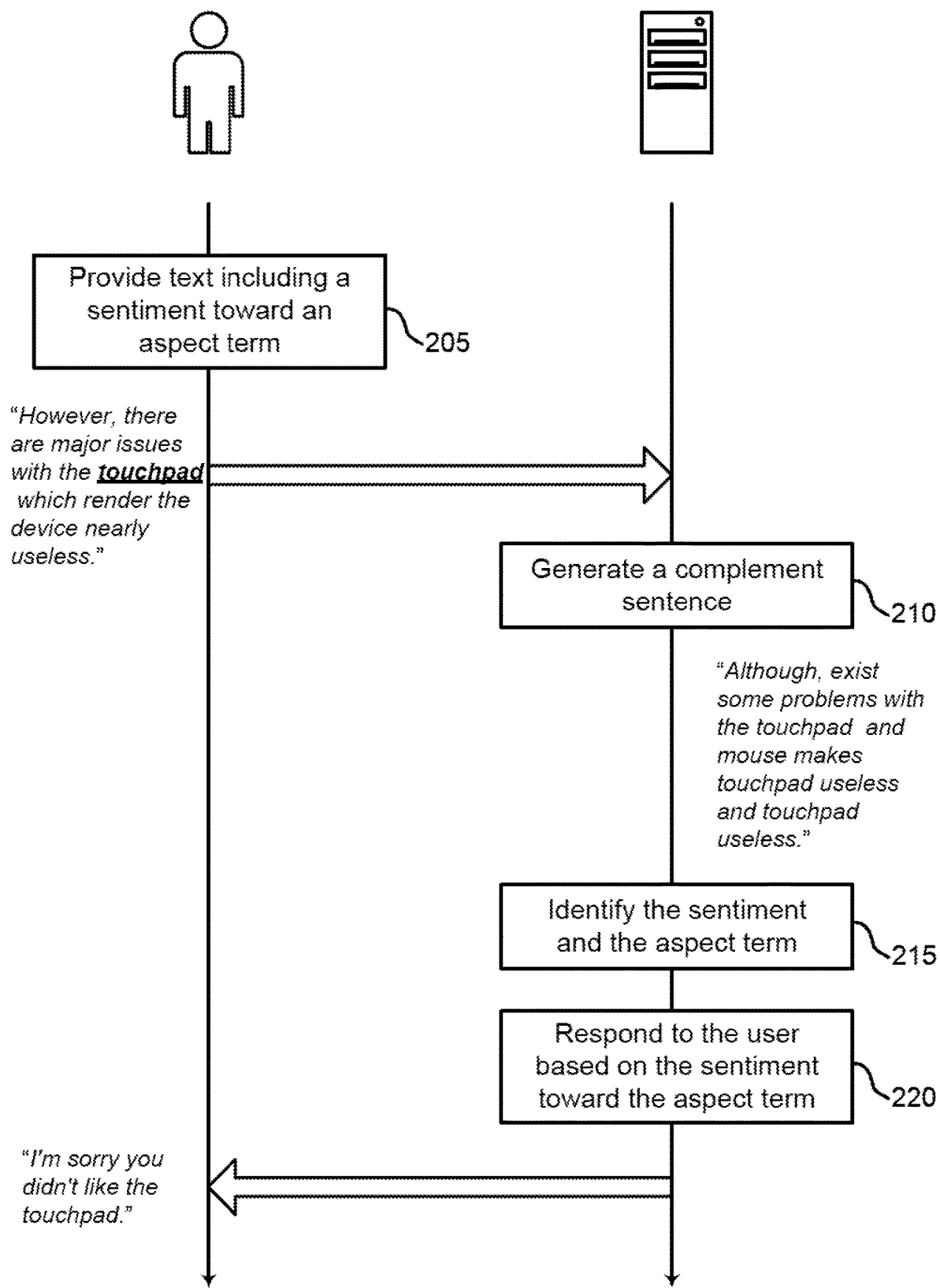
FIG. 2 shows an example of computer dialog processing using aspect-based sentiment analysis according to aspects of the present disclosure.

FIG. 2 shows an example of computer dialog processing using aspect-based sentiment analysis according to aspects of the present disclosure. For example, the method may be performed by user 100 interacting with sentiment analysis apparatus 110 via user device 105 as described with reference to FIG. 1. Sentiment analysis apparatus 110 receives an input phrase including an aspect term from user 100. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the system provides text including a sentiment toward an aspect term. In some cases, the operations of this step refer to, or may be performed by, user as described with reference to FIG. 1. According to some embodiments, the system is configured to perform aspect-based sentiment analysis (ABSA), which is a fine-grained version of sentiment analysis that finds the sentiment polarity of input sentences towards a given aspect or an aspect term. Term-based aspects for ABSA relate to where the aspects correspond to one or more terms (i.e., a sequence of words) in an input sentence/phrase. For example, an input phrase to the system is "However, there are major issues with the touchpad which render the device nearly useless". In the above example, "touchpad" is recognized as the aspect term.

At operation 210, the system generates a complement sentence. In some cases, the operations of this step refer to, or may be performed by, sentiment analysis apparatus as described with reference to FIGS. 1 and 3. For example, the complement sentence is "Although, exist some problems with the touchpad and mouse makes touchpad useless and touchpad useless". In some cases, the compliment sentence is not a well-formed sentence as shown in the example above. The words used in the complement sentence provide helpful information for the task. Touchpad and its related words are repeated in the complement sentence or the generated sentence.

At operation 215, the system identifies the sentiment and the aspect term. In some cases, the operations of this step refer to, or may be performed by, sentiment analysis apparatus as described with reference to FIGS. 1 and 3. A set of sentiment may include positive sentiment, negative sentiment, and neutral sentiment. Based on the input phrase and the aspect term ("touchpad"), in the example above, the system returns a negative sentiment for the input sentence.

At operation 220, the system responds to the user based on the sentiment toward the aspect term. In some cases, the operations of this step refer to, or may be performed by, sentiment analysis apparatus as described with reference to FIGS. 1 and 3. According to the example above, the system's response is "I'm sorry you didn't like the touchpad". The user can view the response and provide another text including a different sequence of words. The aspect term may be different. In some examples, the system's response can be the input to downstream applications. The sentiment information from the sentiment analysis process is used for recommendation (e.g., recommendation of electronic devices such as touchpad). In some cases, the operations of this step refer to, or may be performed by, a user device (e.g., a user device having implemented a sentiment analysis application or computer dialog application) as described with reference to FIG. 1.

Network Architecture

Figure 3:
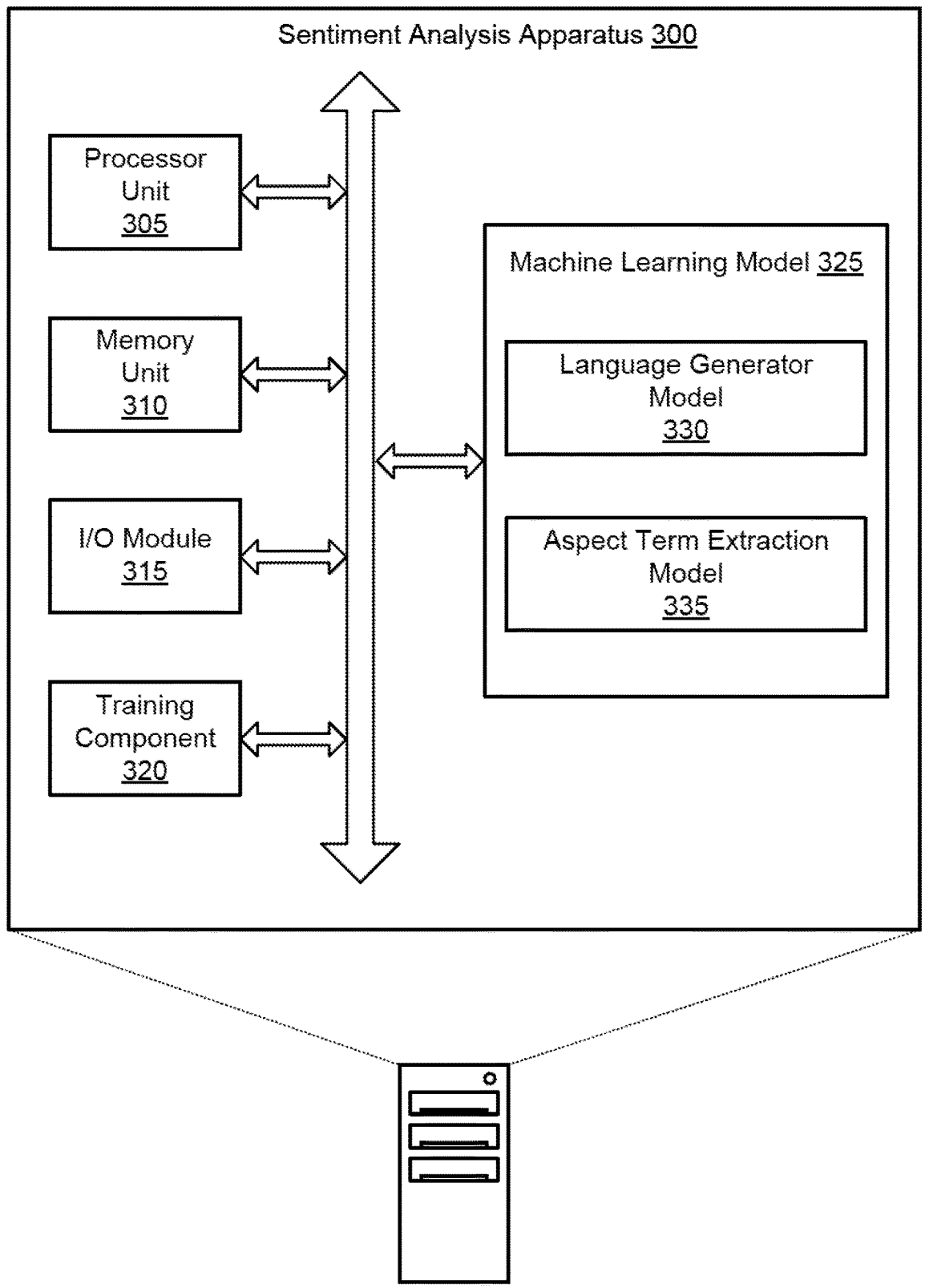
FIG. 3 shows an example of a sentiment analysis apparatus according to aspects of the present disclosure.
Figure 4:
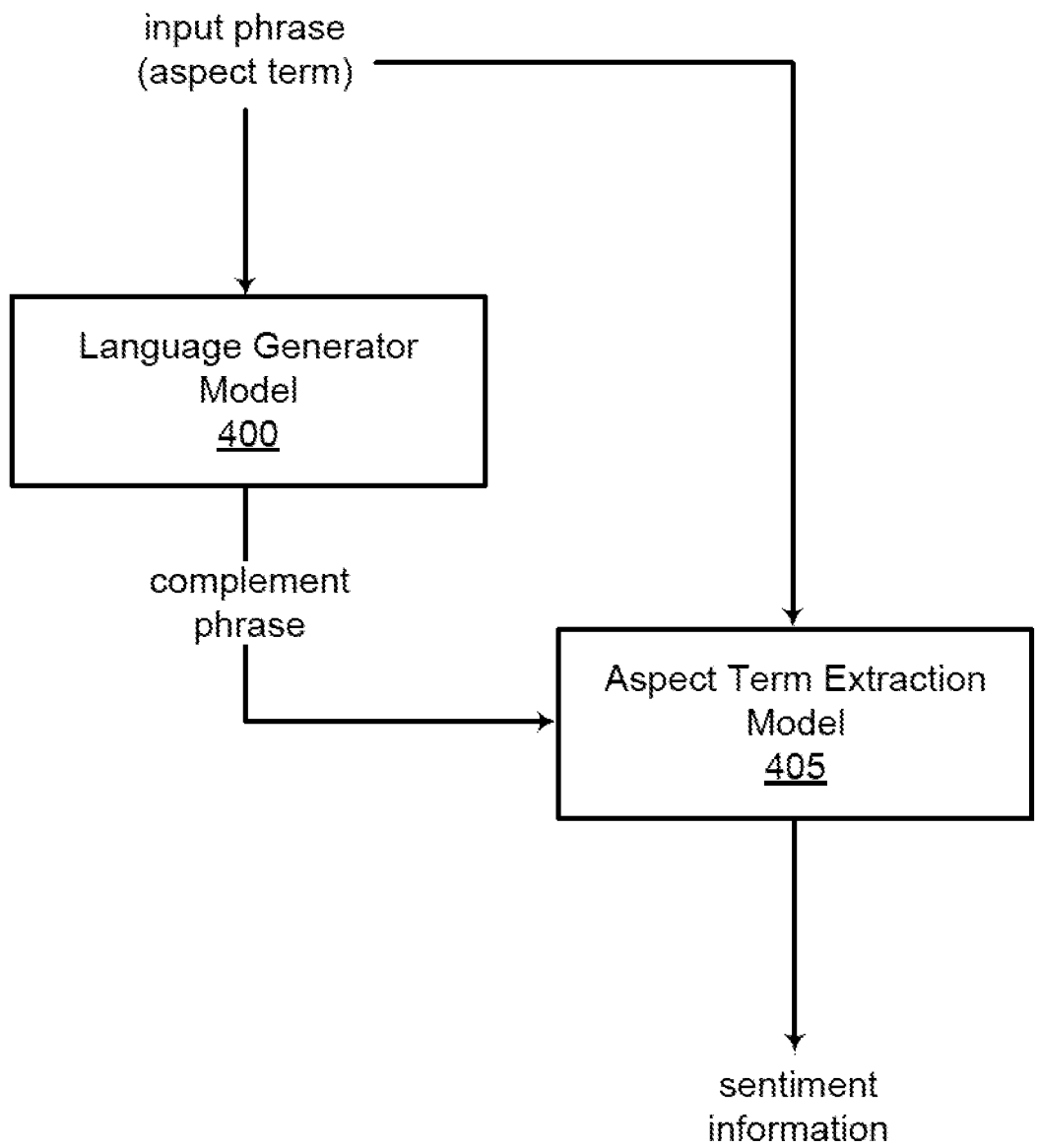
FIG. 4 shows an example of a sentiment analysis diagram according to aspects of the present disclosure.
Figure 5:
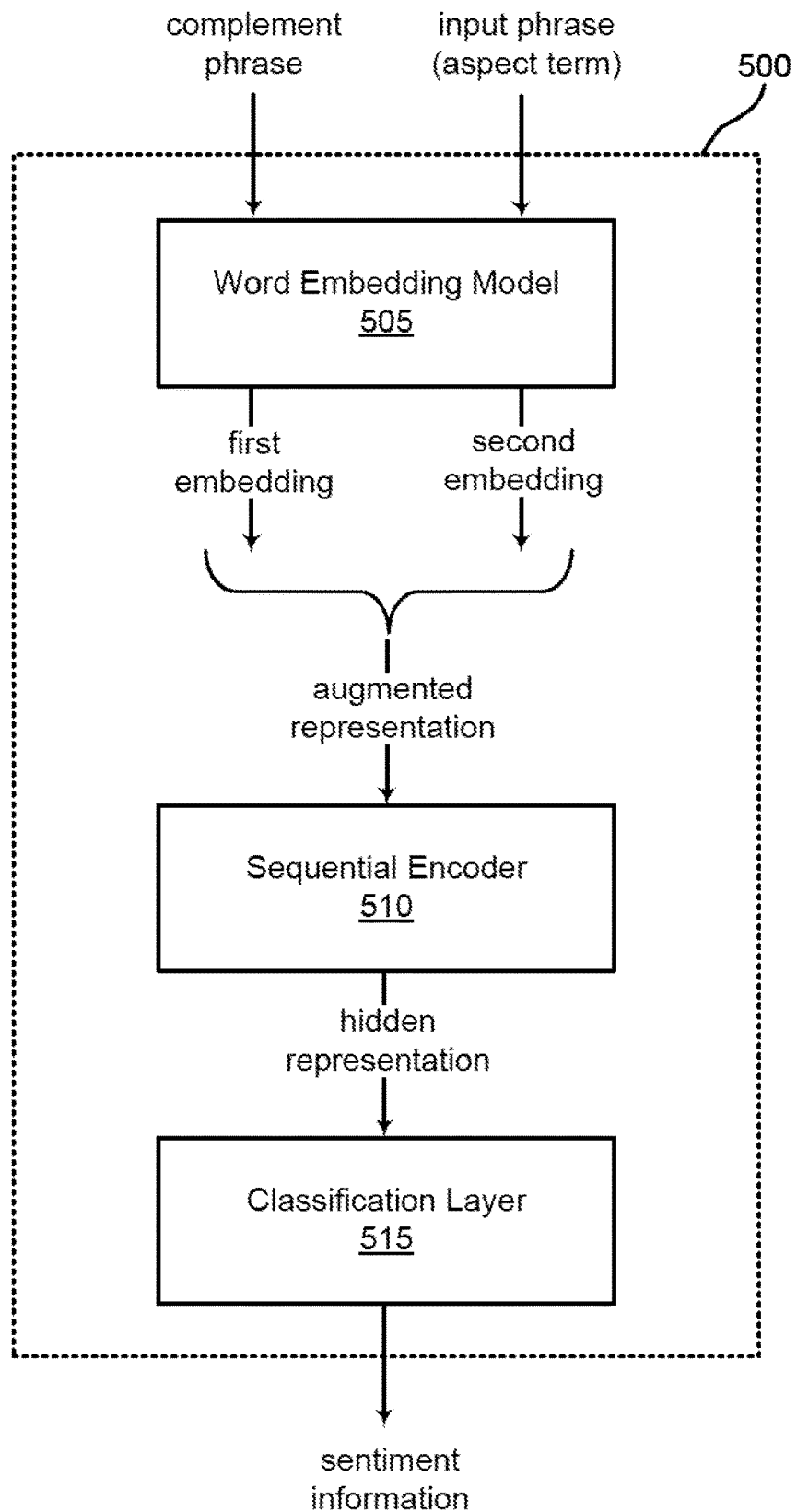
FIG. 5 shows an example of an aspect term extraction model according to aspects of the present disclosure.

In FIGS. 3-5, an apparatus and method for natural language processing are described. One or more embodiments of the apparatus and method include a language generator model configured to generate a complement phrase based on an input phrase, wherein the complement phrase includes different words than the input phrase and an aspect term extraction model configured to generate sentiment information corresponding to an aspect term in the input phrase based on the complement phrase and the input phrase, wherein the aspect term extraction model includes a word embedding component, a sequential encoder, and a classification layer.

In some embodiments, the aspect term extraction model is configured to combine a representation of the input phrase and a representation of the complement phrase to obtain an augmented representation of the input phrase, wherein the sentiment information is generated based on the augmented representation.

Some examples of the apparatus and method further include a training component configured to train the language generator model to generate the complement phrase and to train the aspect term extraction model based on the trained language generator model.

FIG. 3 shows an example of a sentiment analysis apparatus 300 according to aspects of the present disclosure. The example shown includes sentiment analysis apparatus 300, processor unit 305, memory unit 310, I/O module 315, training component 320, machine learning model 325, language generator model 330, and aspect term extraction model 335. Sentiment analysis apparatus 300 is an example of, or includes aspects of, the corresponding element described with reference to FIG. 1.

Processor unit 305 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 305 is configured to operate a memory array using a memory controller. In other cases, a memory controller is integrated into the processor. In some cases, processor unit 305 is configured to execute computer-readable instructions stored in a memory to perform various functions. In some embodiments, processor unit 305 includes special purpose components for modem processing, baseband processing, digital signal processing, or transmission processing.

Examples of memory unit 310 include random access memory (RAM), read-only memory (ROM), or a hard disk. Examples of memory unit 310 include solid state memory and a hard disk drive. In some examples, memory unit 310 is used to store computer-readable, computer-executable software including instructions that, when executed, cause a processor to perform various functions described herein. In some cases, memory unit 310 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 310 store information in the form of a logical state.

I/O module 315 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 315 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, sentiment analysis apparatus 300 includes a computer implemented artificial neural network (ANN) for generating sentiment information corresponding to an aspect term (e.g., touch pad) in an input phrase based on an augmented representation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 320 trains aspect term extraction model 335 using a training set including an input phrase and ground truth sentiment information for the input phrase. In some examples, training component 320 updates parameters of aspect term extraction model 335 based on the augmented representation.

In some examples, training component 320 identifies an intermediate complement representation based on the input phrase. Training component 320 combines the representation of the input phrase with the intermediate complement representation to obtain a combined intermediate representation of the input phrase. Next, training component 320 compares the sentiment information to the ground truth sentiment information. Training component 320 updates the intermediate complement representation based on the comparison. In some examples, training component 320 computes a similarity between the representation of the input phrase and the intermediate complement representation, where the intermediate complement representation is updated to minimize the similarity.

In some examples, training component 320 maps each element of the intermediate complement representation into a word embedding space. Training component 320 selects a closest word for each element of the intermediate complement representation based on the mapping. Training component 320 computes a distance between the closest word and a corresponding element of the intermediate complement representation, where the intermediate complement representation is updated to minimize the distance.

In some examples, training component 320 generates an intermediate complement phrase based on the intermediate complement representation. Training component 320 compares a version of the complement phrase to the intermediate complement phrase. Training component 320 updates parameters of a language generator model 330 based on the comparison, where the complement phrase is generated by the language generator model 330.

In some examples, training component 320 maps each element of the intermediate complement representation into a word embedding space. Training component 320 selects a closest word for each element of the intermediate complement representation based on the mapping, where the intermediate complement phrase includes the closest word for each element of the intermediate complement representation. In some examples, training component 320 compares a length of the input phrase to a length of the version of the complement phrase, where the parameters of the language generator model 330 are updated based on the comparison of the length of the input phrase to the length of the version of the complement phrase.

In some examples, training component 320 computes a difference between the input phrase and the complement phrase. Training component 320 computes a reward based on the difference, where the parameters of the language generator model 330 are updated based on the reward. In some examples, training component 320 identifies a tradeoff parameter, where the combined intermediate representation and the augmented representation are formed based on the tradeoff parameter.

In some examples, training component 320 compares the predicted sentiment information to the ground truth sentiment information. In some examples, training component 320 updates the parameters of the aspect term extraction model 335 based on the comparison.

According to some embodiments, training component 320 is configured to train the language generator model 330 to generate the complement phrase and to train the aspect term extraction model 335 based on the trained language generator model 330.

According to some embodiments, language generator model 330 generates a complement phrase based on the input phrase, where the complement phrase includes different words than the input phrase. Language generator model 330 generates the complement phrase based on an output of aspect term extraction model 335. Language generator model 330 is an example of, or includes aspects of, the corresponding element described with reference to FIG. 4.

According to some embodiments, aspect term extraction model 335 receives an input phrase including an aspect term. In some examples, aspect term extraction model 335 combines a representation of the input phrase and a representation of the complement phrase to obtain an augmented representation of the input phrase. Aspect term extraction model 335 generates sentiment information corresponding to the aspect term based on the augmented representation.

In some examples, aspect term extraction model 335 generates a contextualized word embedding for each word of the input phrase, where the representation of the input phrase includes the contextualized word embedding. Aspect term extraction model 335 computes a non-contextualized word embedding for each word of the complement phrase. Aspect term extraction model 335 maps the non-contextualized word embedding to an embedding space of the contextualized word embedding, where the representation of the complement phrase includes the mapping of the non-contextualized word embedding.

In some examples, aspect term extraction model 335 applies a sequential encoder to the augmented representation to obtain a hidden representation of the input phrase. Aspect term extraction model 335 applies a classification layer to the hidden representation to classify each word of the input phrase, where the sentiment information is based on the classification of each word of the input phrase. In some examples, the sentiment information includes location information for the aspect term in the input phrase. In some examples, aspect term extraction model 335 predicts a sentiment of the input phrase toward the aspect term.

In some examples, aspect term extraction model 335 predicts sentiment information based on the combined intermediate representation. In some examples, aspect term extraction model 335 classifies each word of the input phrase to obtain predicted sentiment information. In some examples, aspect term extraction model 335 computes a word embedding for each word of the complement phrase, where the representation of the complement phrase includes the word embedding.

According to some embodiments, aspect term extraction model 335 is configured to generate sentiment information corresponding to an aspect term in the input phrase based on the complement phrase and the input phrase, wherein the aspect term extraction model 335 includes a word embedding component, a sequential encoder, and a classification layer. Aspect term extraction model 335 is an example of, or includes aspects of, the corresponding element described with reference to FIGS. 4 and 5.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 4 shows an example of a sentiment analysis diagram according to aspects of the present disclosure. The example shown includes language generator model 400 and aspect term extraction model 405 as described in FIG. 3. One or more embodiments of the present disclosure train language generator model 400 and aspect term extraction model 405 to perform aspect term extraction (ATE). In some examples, ATE dataset is used to train a deep learning model which is then used to generate complement representations for each input phrase of the training data. A pre-trained language generator model (e.g., Generative Pre-trained Transformer or GPT) is fine-tuned to generate sentences similar to complement sentences found in previous steps (with GloVe mapping). GPT is a deep learning model capable of producing human-like text and is trained on large text datasets. In some examples, the pre-trained language generator model includes GPT-2.

As an example shown in FIG. 4, an input phrase including an aspect term is input to language generator model 400. Language generator model 400 outputs a complement phrase. Aspect term extraction model 405 generates sentiment information based on the input phrase and the complement phrase. Language generator model 400 is an example of, or includes aspects of, the corresponding element described with reference to FIG. 3. Aspect term extraction model 405 is an example of, or includes aspects of, the corresponding element described with reference to FIGS. 3 and 5.

FIG. 5 shows an example of an aspect term extraction model 500 according to aspects of the present disclosure. The example shown includes aspect term extraction model 500 as described in FIGS. 3-4. Aspect term extraction model 500 further includes word embedding model 505, sequential encoder 510, and classification layer 515. According to an embodiment, an input phrase including an aspect term and a complement phrase are input to word embedding model 505. The complement phrase is generated based on the input phrase using a language generator model described in FIGS. 3 and 4. Word embedding model 505 generates a first embedding based on the complement phrase. Word embedding model 505 generates a second embedding based on the input phrase. In some cases, the first embedding is also referred to as a representation of the complement phrase. Additionally, the second embedding is referred to as a representation of the input phrase. The representation of the complement phrase and representation of the input phrase are combined to obtain an augmented representation of the input phrase (i.e., sum of the corresponding word representations). The augmented representation is input to sequential encoder 510 to obtain a hidden representation of the input phrase. The hidden representation is then input to classification layer 515 to classify each word of the input phrase, where the aspect information is based on the classification of each word of the input phrase. Aspect term extraction model 500 is an example of, or includes aspects of, the corresponding element described with reference to FIGS. 3 and 4. In some examples, sequential encoder 510 includes Bi-LSTM network. Classification layer 515 includes a feed-forward layer. Bidirectional long short-term memory (Bi-LSTM) is a variant of LSTM. Input to a Bi-LSTM is given from both two directions. As a result, in Bi-LSTM, a state at each time step consists of the state of two LSTMs, one going left and one going right. An LSTM is a form of recurrent neural network (RNN) that includes feedback connections. In one example, and LSTM includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) issues when training an RNN. In the context where input is text sequence, a state in Bi-LSTM thus has information about both preceding words and succeeding words.

Aspect-Based Sentiment Analysis

Figure 6:
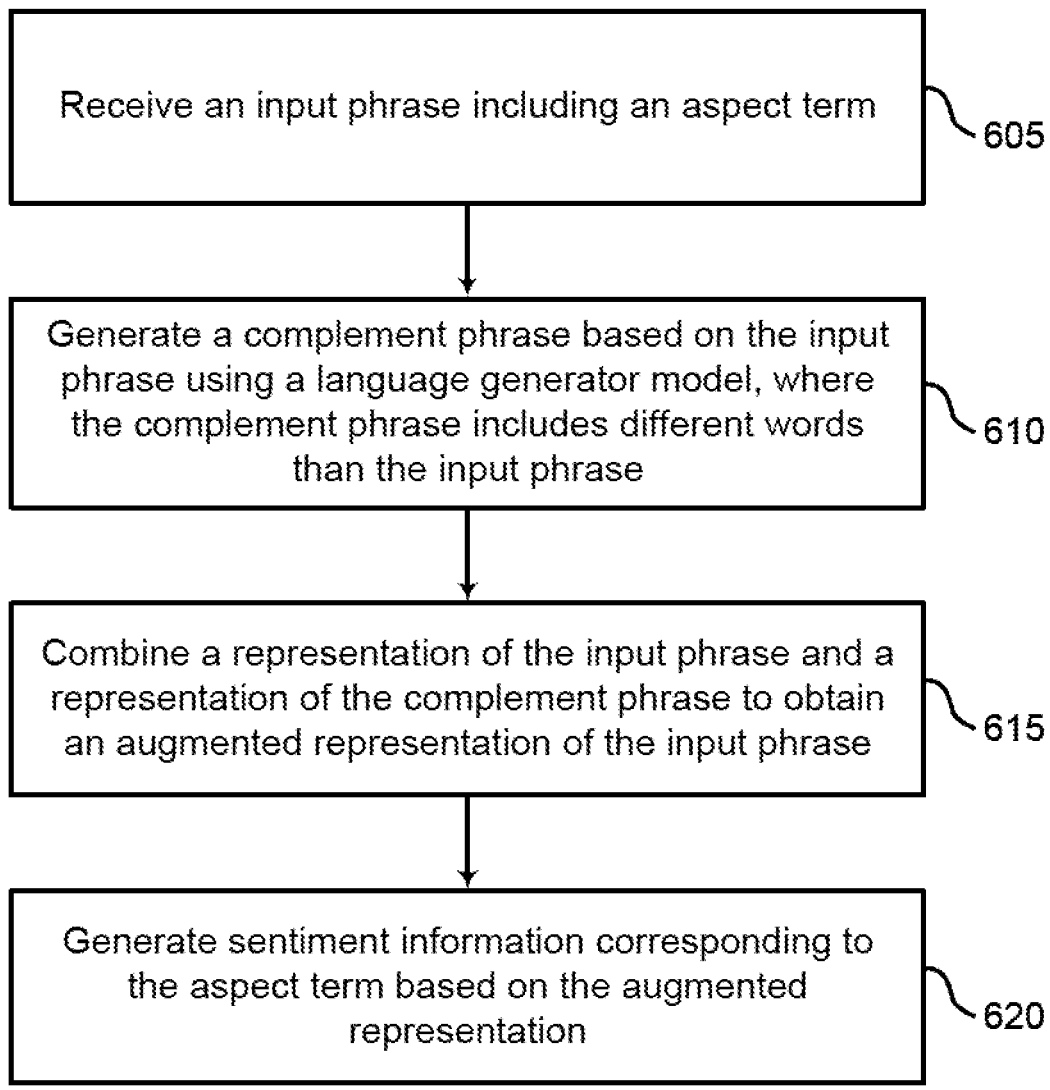
FIG. 6 shows an example of generating sentiment information according to aspects of the present disclosure.
Figure 7:
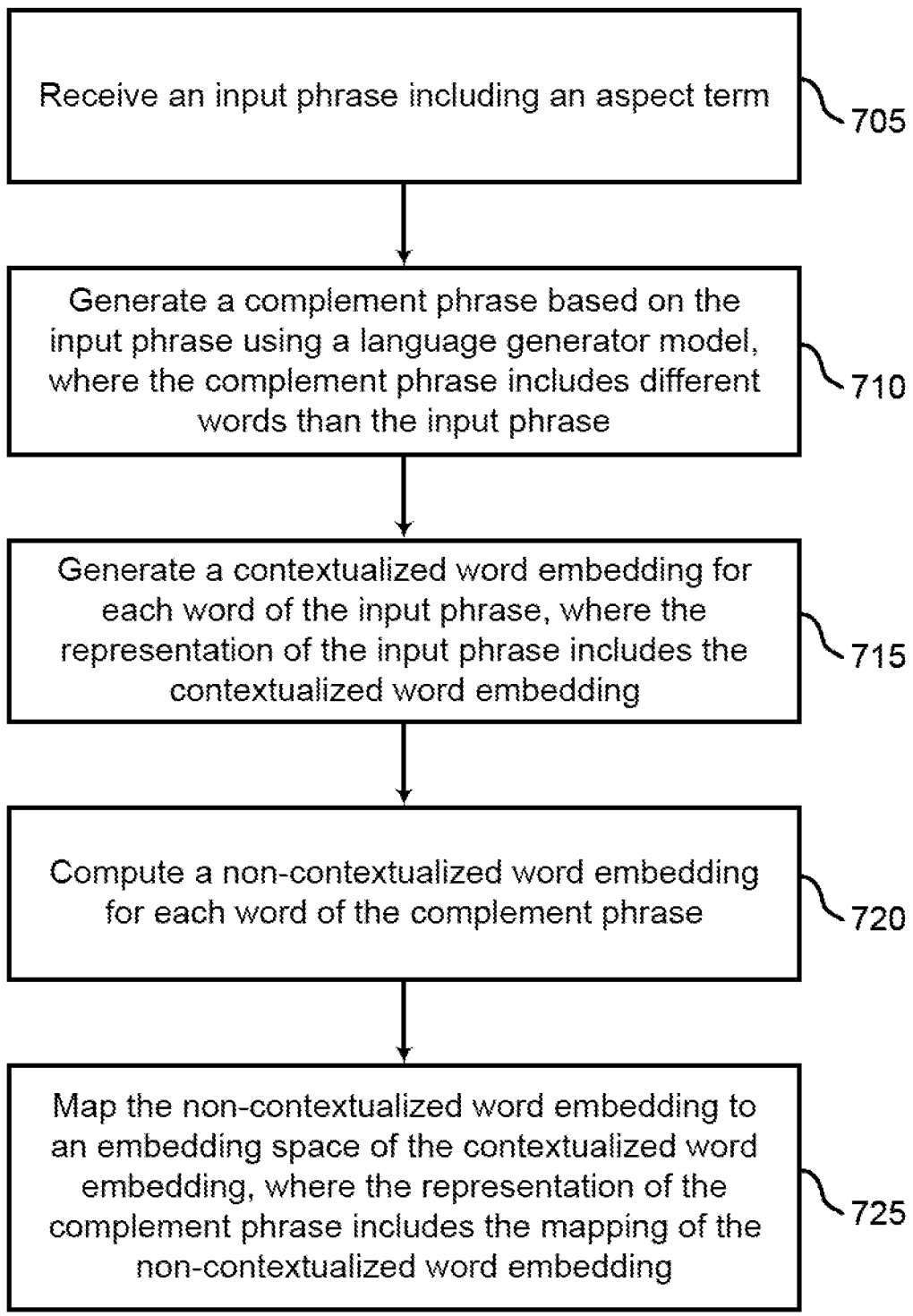
FIG. 7 shows an example of mapping non-contextualized word embedding to an embedding space of contextualized word embedding according to aspects of the present disclosure.

In FIGS. 6-7, a method, apparatus, and non-transitory computer readable medium for natural language processing are described. One or more embodiments of the method, apparatus, and non-transitory computer readable medium include receiving an input phrase including an aspect term; generating a complement phrase based on the input phrase using a language generator model, wherein the complement phrase includes different words than the input phrase; combining a representation of the input phrase and a representation of the complement phrase to obtain an augmented representation of the input phrase; and generating sentiment information corresponding to the aspect term based on the augmented representation.

Some examples of the method, apparatus, and non-transitory computer readable medium further include generating a contextualized word embedding for each word of the input phrase, wherein the representation of the input phrase includes the contextualized word embedding.

Some examples of the method, apparatus, and non-transitory computer readable medium further include computing a non-contextualized word embedding for each word of the complement phrase. Some examples further include mapping the non-contextualized word embedding to an embedding space of the contextualized word embedding, wherein the representation of the complement phrase includes the mapping of the non-contextualized word embedding.

Some examples of the method, apparatus, and non-transitory computer readable medium further include applying a sequential encoder to the augmented representation to obtain a hidden representation of the input phrase. Some examples further include applying a classification layer to the hidden representation to classify each word of the input phrase, wherein the sentiment information is based on the classification of each word of the input phrase.

In some embodiments, the sentiment information includes location information for the aspect term in the input phrase. Some examples of the method, apparatus, and non-transitory computer readable medium further include predicting a sentiment of the input phrase toward the aspect term.

FIG. 6 shows an example of generating sentiment information according to aspects of the present disclosure. The sentiment analysis apparatus 110 with regards to FIG. 1 generates sentiment information corresponding to an aspect term in an input phrase. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system receives an input phrase including an aspect term. In some cases, the operations of this step refer to, or may be performed by, aspect term extraction model as described with reference to FIGS. 3-5. In some examples, an input phrase includes an aspect term (i.e., a target phrase). The aspect term extraction model is configured to locate an aspect term in the input phrase and further predict sentiment of the input phrase toward the aspect term. An example input phrase from a user is "However, there are major issues with the touchpad which render the device nearly useless". In this example, "touchpad" may be recognized as an aspect term in the input phrase.

At operation 610, the system generates a complement phrase based on the input phrase using a language generator model, where the complement phrase includes different words than the input phrase. In some cases, the operations of this step refer to, or may be performed by, language generator model as described with reference to FIGS. 3 and 4.

In some examples, a language generator model (e.g., a GPT model) is fine-tuned based on a reward function during training. The language generator model produces a respective complement sentence for each original sentence in the training dataset. That is, each original sentence in the training set is associated with a complement sentence. A final aspect term extraction model is then trained on the training data augmented with the complement sentences.

In some cases, a language generator model (or a generative model) is trained to transform original sentences in the training dataset into corresponding complement versions based on pairs of original and complement sentences as training data for the language generator model. At inference time, the language generator model generates a complement sentence based on the input phrase and relies on GloVe embeddings to produce complement representation vectors for data augmentation.

At operation 615, the system combines a representation of the input phrase and a representation of the complement phrase to obtain an augmented representation of the input phrase. In some cases, the operations of this step refer to, or may be performed by, aspect term extraction model as described with reference to FIGS. 3-5. The augmented representation of the input phrase is input to a sequential encoder such as a Bi-LSTM network. The output from the sequential encoder is then input to a feed-forward layer to obtain label distribution used for generating sentiment information and subsequent prediction.

At operation 620, the system generates sentiment information corresponding to the aspect term based on the augmented representation. In some cases, the operations of this step refer to, or may be performed by, aspect term extraction model as described with reference to FIGS. 3-5. In some embodiments, aspect term extraction is formulated as a sequence labeling task.

For example, given an input phrase $S=[w_1, w_2, \ldots, w_n]$, sentiment analysis apparatus 110 as described in FIG. 1 is trained to predict label sequence $Y=[y_1, y_2, \ldots, y_n]$ where $y_i \in \{B, I, O\}$. In some examples, B stands for the "beginning of a target", I stands for "inside a target", and O stands for "other". In some examples, sentiment information includes location information for the aspect term (e.g., "touchpad") in the input phrase.

According to an embodiment, the augmented representation of the input phrase is input to a feed-forward neural network with softmax to estimate the probability distribution over the class labels. The softmax function is used as the activation function of the neural network to normalize the output of the network to a probability distribution over predicted output classes. After applying the softmax function, each component of the feature map is in the interval (0, 1) and the components add up to one. These values are interpreted as probabilities.

FIG. 7 shows an example of mapping non-contextualized word embedding to an embedding space of contextualized word embedding according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives an input phrase including an aspect term. In some cases, the operations of this step refer to, or may be performed by, aspect term extraction model as described with reference to FIGS. 3-5.

At operation 710, the system generates a complement phrase based on the input phrase using a language generator model, where the complement phrase includes different words than the input phrase. In some cases, the operations of this step refer to, or may be performed by, language generator model as described with reference to FIGS. 3 and 4.

At operation 715, the system generates a contextualized word embedding for each word of the input phrase, where the representation of the input phrase includes the contextualized word embedding. In some cases, the operations of this step refer to, or may be performed by, aspect term extraction model as described with reference to FIGS. 3-5. In some examples, the input phrase S is input to a pre-trained BERT model to obtain the contextualized word embeddings $X=[x_1, x_2, \ldots, x_n]$. Note $x_i$ is the average of the representation vectors for the word-pieces of $w_i$ in the last layer of BERT.

At operation 720, the system computes a non-contextualized word embedding for each word of the complement phrase. In some cases, the operations of this step refer to, or may be performed by, aspect term extraction model as described with reference to FIGS. 3-5.

At operation 725, the system maps the non-contextualized word embedding to an embedding space of the contextualized word embedding, where the representation of the complement phrase includes the mapping of the non-contextualized word embedding. In some cases, the operations of this step refer to, or may be performed by, aspect term extraction model as described with reference to FIGS. 3-5.

Training

In FIGS. 8-13, a method, apparatus, and non-transitory computer readable medium for training a neural network are described. One or more embodiments of the method, apparatus, and non-transitory computer readable medium include training an aspect term extraction model using a training set comprising an input phrase and ground truth sentiment information for the input phrase; generating a complement phrase corresponding to the input phrase based at least in part on an output of the aspect term extraction model, wherein the complement phrase includes different words than the input phrase; combining a representation of the input phrase and a representation of the complement phrase to obtain an augmented representation of the input phrase; and updating parameters of the aspect term extraction model based on the augmented representation.

Some examples of the method, apparatus, and non-transitory computer readable medium further include identifying an intermediate complement representation based on the input phrase. Some examples further include combining the representation of the input phrase with the intermediate complement representation to obtain a combined intermediate representation of the input phrase. Some examples further include predicting sentiment information based on the combined intermediate representation using the aspect term extraction model. Some examples further include comparing the sentiment information to the ground truth sentiment information. Some examples further include updating the intermediate complement representation based on the comparison.

Some examples of the method, apparatus, and non-transitory computer readable medium further include computing a similarity between the representation of the input phrase and the intermediate complement representation, wherein the intermediate complement representation is updated to minimize the similarity.

Some examples of the method, apparatus, and non-transitory computer readable medium further include mapping each element of the intermediate complement representation into a word embedding space. Some examples further include selecting a closest word for each element of the intermediate complement representation based on the mapping. Some examples further include computing a distance between the closest word and a corresponding element of the intermediate complement representation, wherein the intermediate complement representation is updated to minimize the distance.

Some examples of the method, apparatus, and non-transitory computer readable medium further include generating an intermediate complement phrase based on the intermediate complement representation. Some examples further include comparing a version of the complement phrase to the intermediate complement phrase. Some examples further include updating parameters of a language generator model based on the comparison, wherein the complement phrase is generated by the language generator model.

Some examples of the method, apparatus, and non-transitory computer readable medium further include mapping each element of the intermediate complement representation into a word embedding space. Some examples further include selecting a closest word for each element of the intermediate complement representation based on the mapping, wherein the intermediate complement phrase comprises the closest word for each element of the intermediate complement representation.

Some examples of the method, apparatus, and non-transitory computer readable medium further include comparing a length of the input phrase to a length of the version of the complement phrase, wherein the parameters of the language generator model are updated based on the comparison of the length of the input phrase to the length of the version of the complement phrase.

Some examples of the method, apparatus, and non-transitory computer readable medium further include computing a difference between the input phrase and the complement phrase. Some examples further include computing a reward based on the difference, wherein the parameters of the language generator model are updated based on the reward.

Some examples of the method, apparatus, and non-transitory computer readable medium further include identifying a tradeoff parameter, wherein the combined intermediate representation and the augmented representation are formed based on the tradeoff parameter.

Some examples of the method, apparatus, and non-transitory computer readable medium further include classifying each word of the input phrase using the aspect term extraction model to obtain predicted sentiment information. Some examples further include comparing the predicted sentiment information to the ground truth sentiment information. Some examples further include updating the parameters of the aspect term extraction model based on the comparison.

Some examples of the method, apparatus, and non-transitory computer readable medium further include computing a word embedding for each word of the complement phrase, wherein the representation of the complement phrase includes the word embedding.

Figure 8:
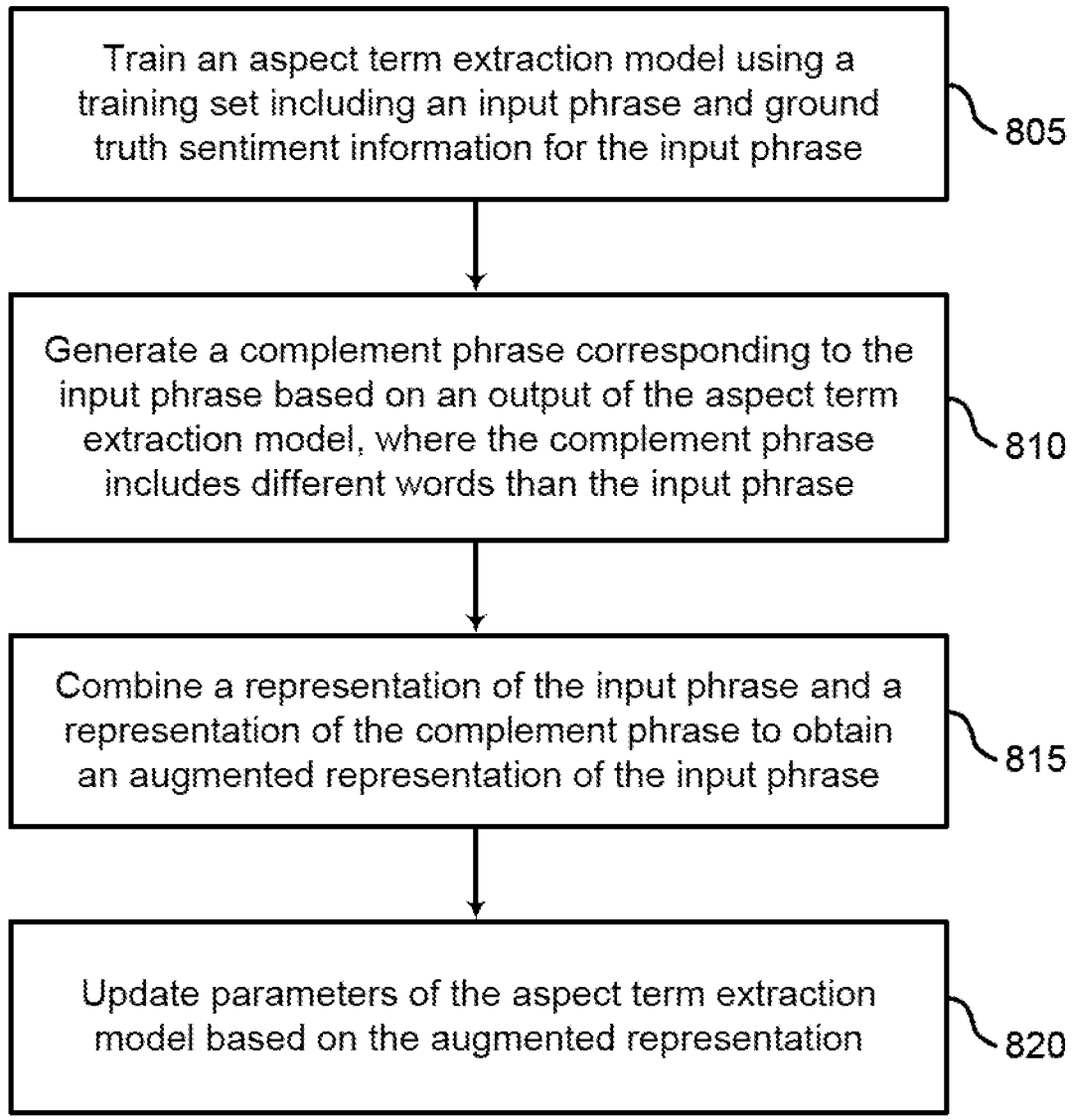
FIG. 8 shows an example of training a neural network according to aspects of the present disclosure.

FIG. 8 shows an example of training a neural network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data comprising a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Reinforcement learning is one of three basic machine learning paradigms, alongside supervised learning and unsupervised learning. Specifically, reinforcement learning relates to how software agents make decisions in order to maximize a reward. The decision making model may be referred to as a policy. This type of learning differs from supervised learning in that labelled training data is not needed, and errors need not be explicitly corrected. Instead, reinforcement learning balances exploration of unknown options and exploitation of existing knowledge. In some cases, the reinforcement learning environment is stated in the form of a Markov decision process (MDP). Furthermore, many reinforcement learning algorithms utilize dynamic programming techniques. However, one difference between reinforcement learning and other dynamic programming methods is that reinforcement learning does not require an exact mathematical model of the MDP. Therefore, reinforcement learning models may be used for large MDPs where exact methods are impractical. Training via reinforcement learning will be described in more detail in FIG. 13.

At operation 805, the system trains an aspect term extraction model using a training set including an input phrase and ground truth sentiment information for the input phrase. In some cases, the operations of this step refer to, or may be performed by, training component as described with reference to FIG. 3.

According to an embodiment, the training component trains a base model (i.e., the aspect term extraction model) on labeled aspect term extraction (ATE) dataset. In some cases, the trained aspect term extraction model is referred to as a base model. The base model finds the optimal complement representations for input sentences of the ATE dataset in the following step. In some examples, the aspect term extraction model includes bi-directional LSTM (Bi-LSTM) network. Input phrase or input sentence S is first input to a pre-trained BERT to obtain the contextualized word embeddings $X=[x_1, x_2, \ldots, x_n]$, where $x_i$ is the average of the representation vectors for the word-pieces of $w_i$ in the last layer of BERT. BERT (Bidirectional Encoder Representations from Transformers) is a transformer-based method that can be used in NLP tasks. BERT network includes a variable number of encoder layers and self-attention heads. It may include a pre-trained transformer encoder to represent tokenized information based on its bidirectional context. In some cases, it encodes context bidirectionally. The word embeddings X are further abstracted by feeding X into the Bi-LSTM network to obtain the hidden states $H=[h_1, h_2, \ldots, h_n]$. Next, the vectors in H are input to a two-layer feed-forward layer FF to generate label probability distribution $P(\cdot|S, w_i)$ for i-th word: $P(\cdot|S,w_i)=FF(h_i)$. The base model is trained using negative log-likelihood loss:

$$\mathcal{L}_b = -\frac{1}{n}\sum_{i=1}^{n} \log P(y_i \mid S, w_i).$$

At operation 810, the system generates a complement phrase corresponding to the input phrase based on an output of the aspect term extraction model, where the complement phrase includes different words than the input phrase. In some cases, the operations of this step refer to, or may be performed by, language generator model as described with reference to FIGS. 3 and 4. Generated sentences are used to achieve consistency in the training phrase and testing phase. For example, a language generator model (e.g., a fine-tuned GPT-2 model) generates complement sentences for data augmentation in training phase and testing phase. In some examples, fine-tuning GPT-2 involves a 10-fold cross validation for the training data (i.e., similar to the complement embedding optimization). In some examples, a GPT-2 model is fine-tuned on the (S, S') pairs of 9 folds and then generates S" for each sentence in the remaining fold. Each input phrase S in the training data is associated with a generated sentence S". For example, the fine-tuned GPT-2 model generates a complement sentence for each sentence at test time. In some cases, the generated sentence S" is referred to as a complement phrase corresponding to the input phrase S.

At operation 815, the system combines a representation of the input phrase and a representation of the complement phrase to obtain an augmented representation of the input phrase. In some cases, the operations of this step refer to, or may be performed by, aspect term extraction model as described with reference to FIGS. 3-5.

According to an embodiment, complement sentence $S"=[w_1", w_2", \ldots, w_n"]$, (i.e., for each sentence S in the training or test dataset) from the GPT-2 model is transformed into a representation vector sequence $X"=[x"_1, x"_2, \ldots, x"_n]$ based on mappings for the corresponding words $w"_i$ from GloVe embeddings. X" is defined as a representation of the complement phrase S". In some cases, complement phrase S" has a different length compared to original sentence S. Hence, vector sequence X" may be truncated to be of the same length as S. Next, augmented representation of the input phrase $\bar{X}=[\bar{x}_1, \bar{x}_2, \ldots, \bar{x}_n]$ from the two sentences is computed by summing the corresponding word representations: $\bar{x}_i = x_i + \lambda G(x''_i)$, where G is a feed-forward network to match the dimensions of the GloVe embedding $G(x''_i)$ and $x_i$.

At operation 820, the system updates parameters of the aspect term extraction model based on the augmented representation. In some cases, the operations of this step refer to, or may be performed by, training component as described with reference to FIG. 3. Augmented representation of the input phrase $\bar{X}$ are input to a Bi-LSTM network using the aspect term extraction model (based model), followed by a feed-forward layer to obtain label distribution $P(\cdot|S,S'',w_i)$ for the i-th word. The label distribution is used for prediction in the test phase (i.e., inference time) while the training phase depends on the negative log-likelihood over training data to train the final aspect term extraction model:

$$\mathcal{L}_{final} = -\frac{1}{n}\sum_{i=1}^{n} \log P(y_i | S, S'', w_i).$$

Figure 9:
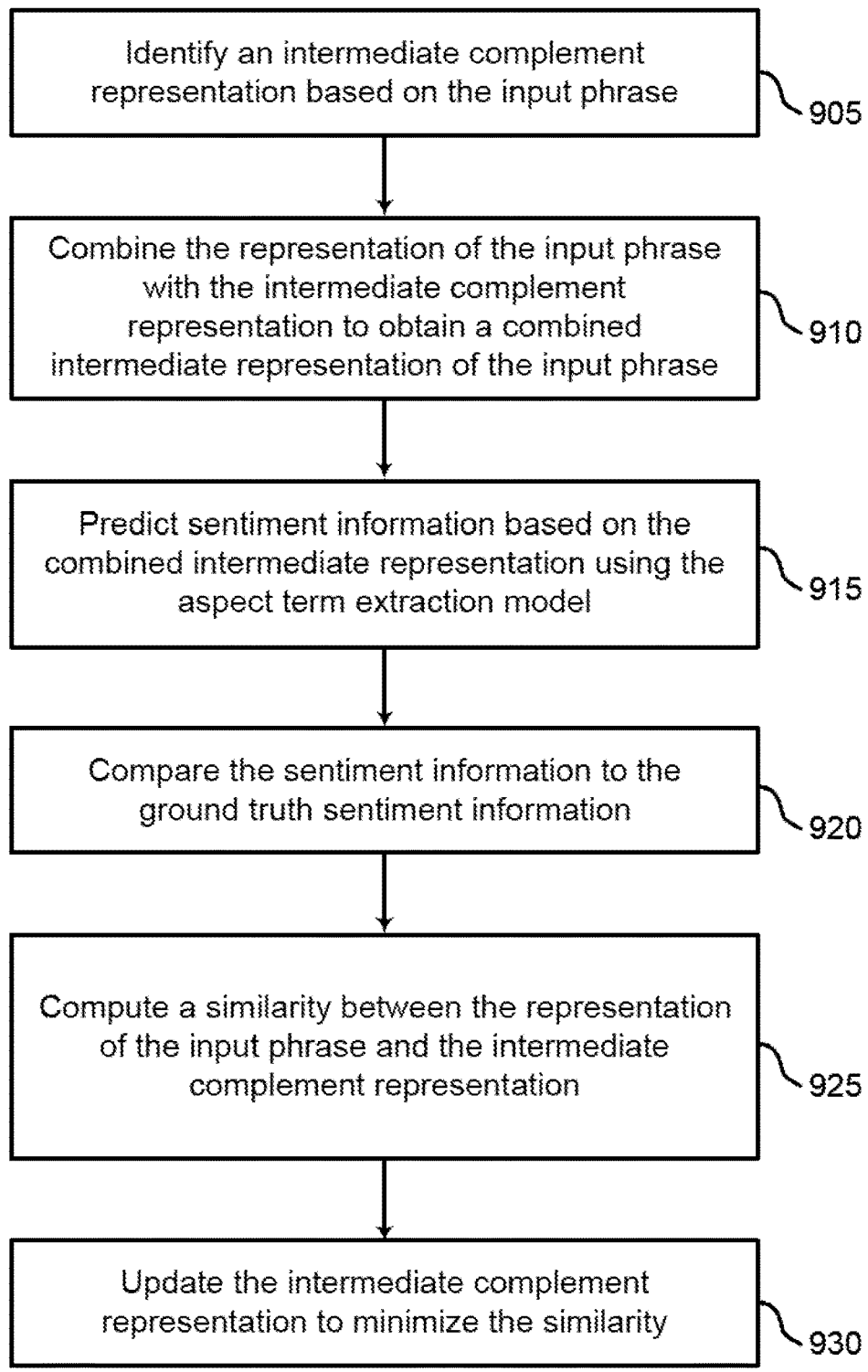
FIG. 9 shows an example of minimizing a similarity between a representation of an input phrase and an intermediate complement representation according to aspects of the present disclosure.

FIG. 9 shows an example of minimizing a similarity between a representation of an input phrase and an intermediate complement representation according to aspects of the present disclosure. Training component 320 described in FIG. 3 is used to train the aspect term extraction model and the language generator model. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system identifies an intermediate complement representation based on the input phrase. In some cases, the operations of this step refer to, or may be performed by, training component as described with reference to FIG. 3.

According to an embodiment, optimal augmentation for a input phrase S in the validation data can be obtained by searching for an intermediate complement phrase S' such that combination of S' and S reduces the objective loss. In some cases, the two sentences may be combined by adding the corresponding word representations which reduce the objective loss $\mathcal{L}_b$ computed on validation data. The augmentation or augmented representation of the input phrase is optimal because the augmented representation is optimized over validation data and not bound to any heuristics-based constraints. The optimality of intermediate complement phrase S' is with regards to objective loss $\mathcal{L}_b$. In some cases, changing criteria may lead to a different intermediate complement phrase S'. In some cases, intermediate complement phrase S' may also be referred to as an intermediate complement sentence.

To find the optimal intermediate complement phrase S' for input phrase S in the validation data, in some embodiments, the training component finds representation vectors X' (i.e., an intermediate complement representation) for its words $w_i$. That is, intermediate complement phrase S' is parameterized by a set of learnable vectors X' which are combined with the word embeddings X (i.e., a representation of the input phrase) and are updated with the objective loss $\mathcal{L}_b$ over validation data. In some cases, X' is defined as an intermediate complement representation or an intermediate complement embedding based on the input phrase S.

At operation 910, the system combines the representation of the input phrase with the intermediate complement representation to obtain a combined intermediate representation of the input phrase. In some cases, the operations of this step refer to, or may be performed by, training component as described with reference to FIG. 3.

According to an embodiment, the sentiment analysis apparatus combines representation of the input phrase X and intermediate complement representation X', that is, the sum of the corresponding vectors $x_i$ and $x'_i$. The number of tokens of X' is equal to the number of tokens of X, i.e., X'=[x'$_1$, x'$_2$, ..., x'$_n$], Additionally, dimension of these vectors match, i.e., $|x_i|=|x'_i|=D$, where D is the dimensionality of the word embedding vectors. Hence, the total number of parameters for representation vectors are N×n×D, where N is the total number of sentences in the validation set.

Next, representation parameters of complement sentences are optimized by reducing objective loss $\mathcal{L}b$ over validation data. In some examples, for input phrase S with embeddings X and intermediate complement phrase S' with parameters X', the sentiment analysis apparatus computes sum of the corresponding vectors for the i-th token: $\hat{x}_i = x_i + \lambda x'_i$ where $\lambda$ is a trade-off parameter (i.e., data augmentation). In some cases, vectors $\hat{X}=[\hat{x}_1, \hat{x}_2, \ldots, \hat{x}_n]$ is defined as a combined intermediate representation of the input phrase S.

At operation 915, the system predicts sentiment information based on the combined intermediate representation using the aspect term extraction model. In some cases, the operations of this step refer to, or may be performed by, aspect term extraction model as described with reference to FIGS. 3-5.

According to an embodiment, combined intermediate representation $\hat{X}=[\hat{x}_1, \hat{x}_2, \ldots, \hat{x}_n]$ are input to the aspect term extraction model (e.g., a base model including Bi-LSTM and a feed-forward layer) to obtain the label distribution $P(\cdot|S, S', w_i)$. The objective loss for this training step, i.e., $\mathcal{L}_f$, is defined similar to $\mathcal{L}_b$:

$$\mathcal{L}_f = -\frac{1}{n}\sum_{i=1}^{n} \log P(y_i | S, S', w_i)$$

(i.e., computed over validation data). The original parameters of the trained aspect term extraction model (i.e., base model) are fixed in this training step. Parameters to be updated are parameters for the intermediate complement phrase S', i.e., intermediate complement representation X'.

At operation 920, the system compares the sentiment information to the ground truth sentiment information. In some cases, the operations of this step refer to, or may be performed by, training component as described with reference to FIG. 3.

At operation 925, the system computes a similarity between the representation of the input phrase and the intermediate complement representation. In some cases, the operations of this step refer to, or may be performed by, training component as described with reference to FIG. 3.

According to an embodiment, the learning objective of complement embeddings includes additional regularization terms. In some cases, the additional regularization terms improve the complement embeddings and facilitate the mapping to intermediate complement phrases S'. A first regularization term (i.e., similarity regularization between the representation of the input phrase and the intermediate complement representation) encourages the intermediate complement embeddings X' to capture different (i.e., complementary) from those for embeddings X of the input phrase S, thus increasing the contribution of complement embeddings. The training component computes representation vectors $R_S$ and $R_{S'}$ for the original phrases and intermediate complement phrases using max-pooling: $R_S$=MAX_POOL($x_1, x_2, \ldots, x_n$) and $R_{S'}$=MAX_POOL($x'_1, x'_2, \ldots, x'_n$). Next, the loss function incorporates dot product $\mathcal{L}_{reg}$ between $R_S$ and $R_{S'}$ for minimization (i.e., minimizing the similarity between $R_S$ and $R_{S'}$) to implement the complementary nature of embeddings: $\mathcal{L}_{reg}=R_S \odot R_{S'}$.

At operation 930, the system updates the intermediate complement representation to minimize the similarity. In some cases, the operations of this step refer to, or may be performed by, training component as described with reference to FIG. 3. The sentiment analysis apparatus is configured to generate intermediate complement representation for each phrase in the validation data (also referred to as validation sentences/phrases) by incorporating the intermediate complement representations into the base model as additional parameters and minimizing the loss of the augmented model on the validation data. In some examples, the training data is divided into k folds at implementation. Optimal complement representations for each phrase are obtained in the validation fold by choosing 1 fold as validation data and treating the remaining k−1 folds as training dataset. The process is repeated for k possible choices of the validation fold that produce a respective intermediate complement representation for each original sentence/phrase in the training data.

Figure 10:
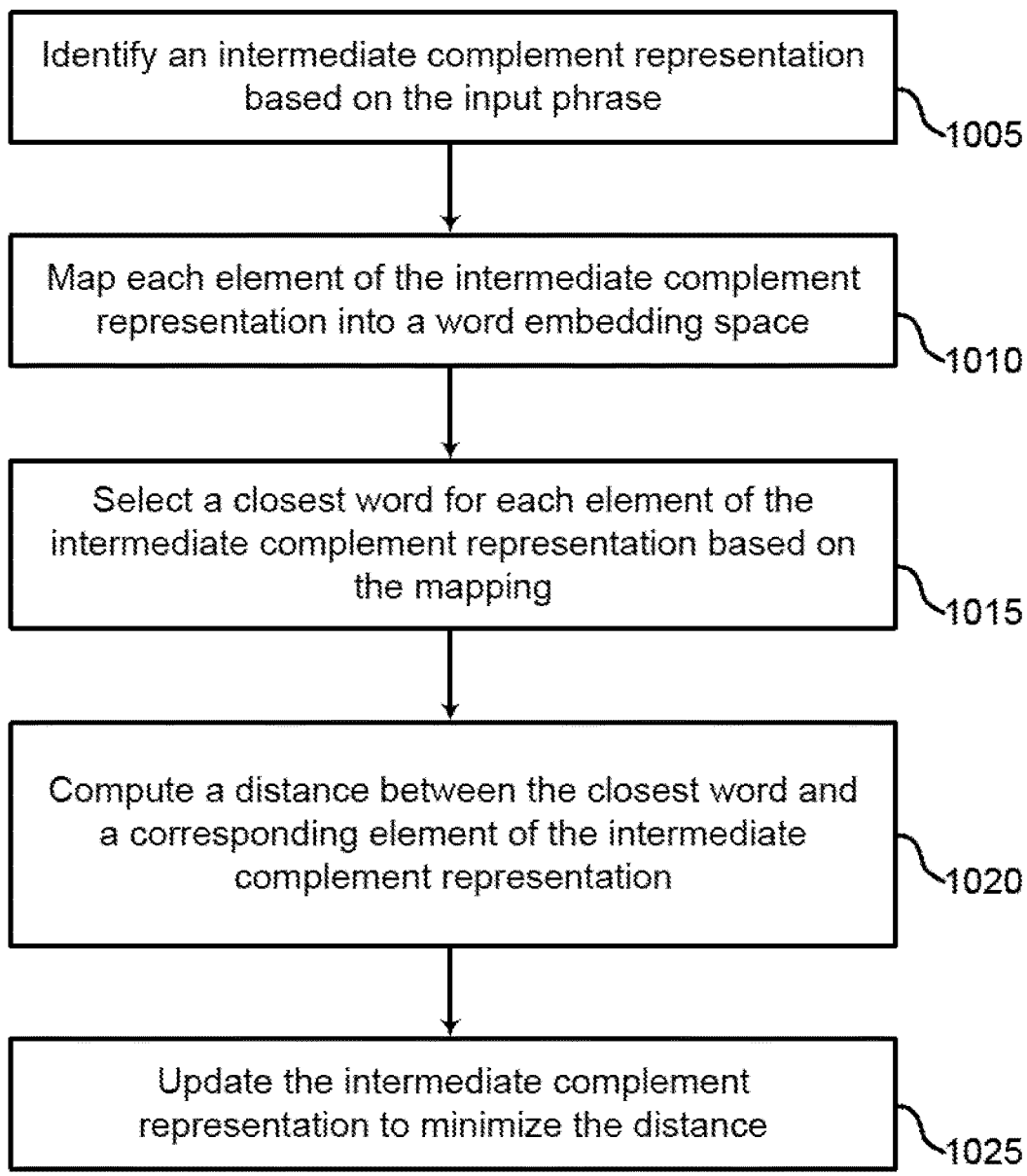
FIG. 10 shows an example of minimizing a distance between a closest word and a corresponding element of an intermediate complement representation according to aspects of the present disclosure.

FIG. 10 shows an example of minimizing a distance between a closest word and a corresponding element of an intermediate complement representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies an intermediate complement representation based on the input phrase. In some cases, the operations of this step refer to, or may be performed by, training component as described with reference to FIG. 3. In some examples, X' is defined as an intermediate complement representation based on the input phrase S.

At operation 1010, the system maps each element of the intermediate complement representation into a word embedding space. In some cases, the operations of this step refer to, or may be performed by, training component as described with reference to FIG. 3.

According to an embodiment, a second regularization term aligns the intermediate complement representation X' to the embedding space of GloVe embeddings to facilitate the transformation to complement sentences in the next step. GloVe embeddings are used herein for convenience and other pre-trained embeddings may be used instead. For each vector $x'_i \in X'$, a feed-forward network F is used to transform $x'_i$ into the vector $F(x'_i)$ of the same dimension with GloVe embeddings. In some examples, GloVe networks are trained to generate GloVe embeddings using aggregated global word-word co-occurrence statistics from a corpus.

At operation 1015, the system selects a closest word for each element of the intermediate complement representation based on the mapping. In some cases, the operations of this step refer to, or may be performed by, training component as described with reference to FIG. 3. According to an embodiment, the sentiment analysis apparatus finds a vector $e_i$ from GloVe embedding table such that $e_i$ has minimum distance to $F(x'_i)$ based on the Euclidean distance.

At operation 1020, the system computes a distance between the closest word and a corresponding element of the intermediate complement representation. In some cases, the operations of this step refer to, or may be performed by, training component as described with reference to FIG. 3. The Euclidean distance between $F(x'_i)$ and $e_i$ is incorporated into the loss function to promote the alignment of intermediate complement embeddings and GloVe embeddings:

$$\mathcal{L}_{GloVe} = \frac{1}{n}\sum_{i=1}^{n} \|F(x'_i) - e_i\|_2^2.$$

the overall loss function used to learn the intermediate complement representations X' is formulated as: $\mathcal{L}_{emb}=\mathcal{L}_f+\alpha_{reg}\mathcal{L}_{reg}+\alpha_{GloVe}\mathcal{L}_{GloVe}$ where $\alpha_{reg}$ and $\alpha_{GloVe}$ are trade-off parameters. The parameters for F are optimized in the process.

At operation 1025, the system updates the intermediate complement representation to minimize the distance. In some cases, the operations of this step refer to, or may be performed by, training component as described with reference to FIG. 3.

This training step produces intermediate complement embedding X' for each phrase in the validation data. For example, the training step may be implemented in a 10-fold validation. In some examples, the base model is trained on 9 folds of the training data and the remaining fold is used as the validation data in the complement representation optimization. Intermediate complement representation X' is obtained for each input phrase in the original training data by alternating the choice of validation fold.

Figure 11:
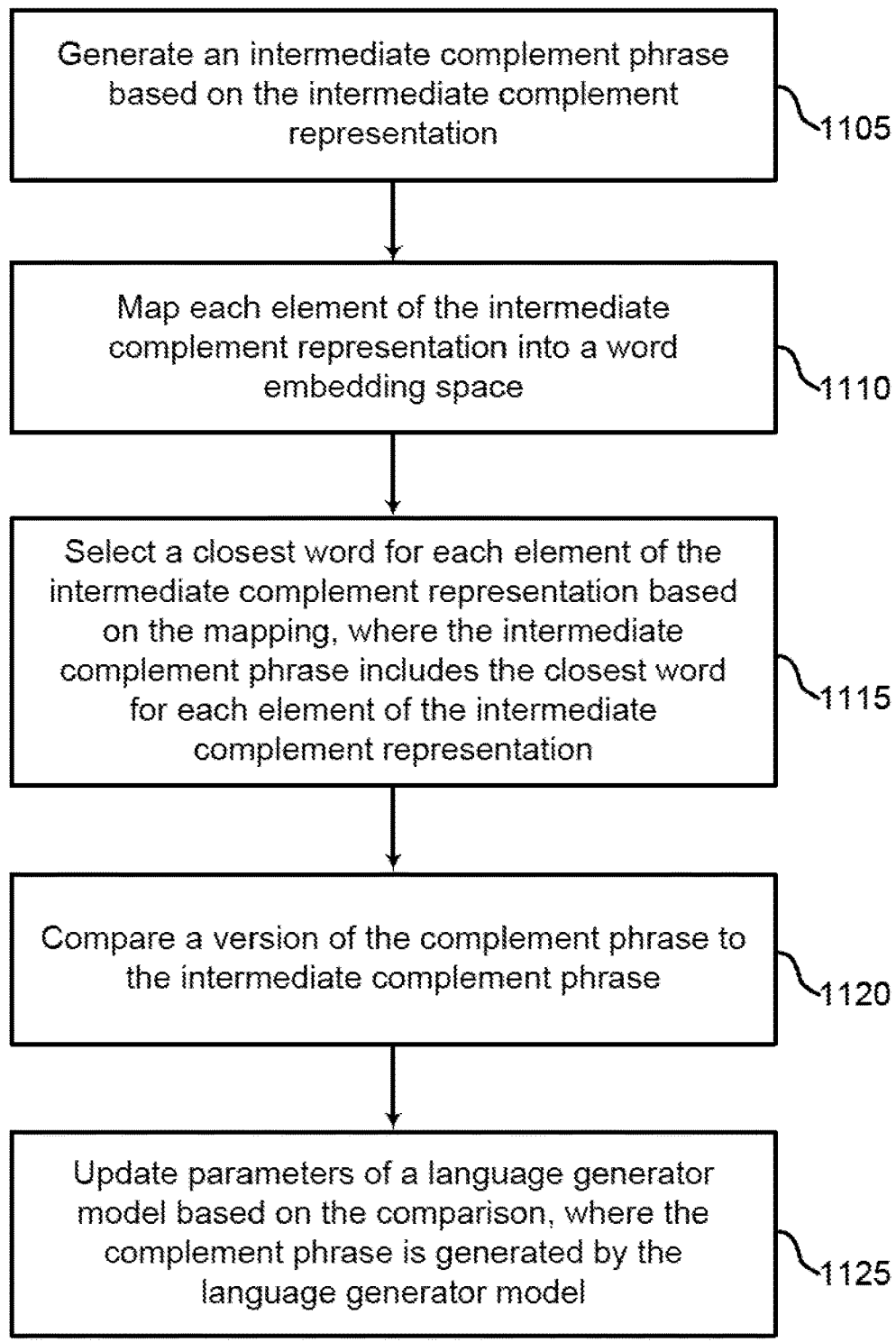
FIG. 11 shows an example of selecting a closest word for each element of an intermediate complement representation according to aspects of the present disclosure.

FIG. 11 shows an example of selecting a closest word for each element of an intermediate complement representation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates an intermediate complement phrase based on the intermediate complement representation. In some cases, the operations of this step refer to, or may be performed by, training component as described with reference to FIG. 3. In some examples, S' is defined as an intermediate complement phrase based on the intermediate complement representation X'. Intermediate complement representation X' may be used directly to augment training data and to train an aspect term extraction model. In some cases, direct augmentation may cause a mismatch between the training phase and test phase because optimization for complement embeddings cannot be performed at test time (due to the unavailability of labels in the datasets). That is, optimization for complement embeddings is not performed at test time.

At operation 1110, the system maps each element of the intermediate complement representation into a word embedding space. In some cases, the operations of this step refer to, or may be performed by, training component as described with reference to FIG. 3.

At operation 1115, the system selects a closest word for each element of the intermediate complement representation based on the mapping, where the intermediate complement phrase includes the closest word for each element of the intermediate complement representation. In some cases, the operations of this step refer to, or may be performed by, training component as described with reference to FIG. 3.

For example, intermediate complement embeddings X' are transformed into intermediate complement phrase S' to enable generating complement embeddings during test time such that S'=[$w'_1, w'_2, \ldots, w'_n$] where $w'_i$ is the word whose GloVe embedding is closest to the transformed complement vector $F(x'_i)$ for $w_i$. The set of each pair (S, S') for phrases S in training data trains a generative language model (i.e., a language generator model) that takes phrase S as input and generates a corresponding intermediate complement phrase S'. Thus, the language generator model at test time can generate complement sentences for test data that, in turn, can be transformed into complement embeddings by mapping words into GloVe embedding vectors for data augmentation.

At operation 1120, the system compares a version of the complement phrase to the intermediate complement phrase. In some cases, the operations of this step refer to, or may be performed by, training component as described with reference to FIG. 3. S" is defined as a version of the complement phrase. In some cases, S" is also referred to as a generated phrase or a generated sentence.

At operation 1125, the system updates parameters of a language generator model based on the comparison, where the complement phrase is generated by the language generator model. In some cases, the operations of this step refer to, or may be performed by, training component as described with reference to FIG. 3.

However, the number of original and intermediate complement sentence pairs (S, S') may be small due to the size of ATE datasets. In some examples, language priors in pre-trained generative models (e.g., GPT model) are used as bootstrap knowledge for the complement generation. In some embodiments, a GPT-2 model may be fine-tuned on the sentence pairs (S,S'). A policy-gradient method for reinforcement learning (e.g., REINFORCE) is used during fine-tuning to incorporate different expected properties for complement sentences. In some examples, the input to GPT-2 includes an input phrase S "$w_1 w_2 \ldots w_n$SEP" from which GPT-2 generates the generated phrase S". According to an embodiment of the present disclosure, multiple objectives are identified to compute reward for the generated phrase S". In some cases, objectives include similarity with complement phrase, length penalty, and difference with original phrase to compute the reward for the generated phrase S".

In some examples, similarity with complement sentence refers to the similarity between the generated phrase S" and the actual complement phrase S'. That is, the training component increases similarity between generated phrase S" and the actual complement phrase S'. In some examples, CIDEr score is used to compute similarity between the two phrases S":$R_{sim}$=CIDEr(S").

Figure 12:
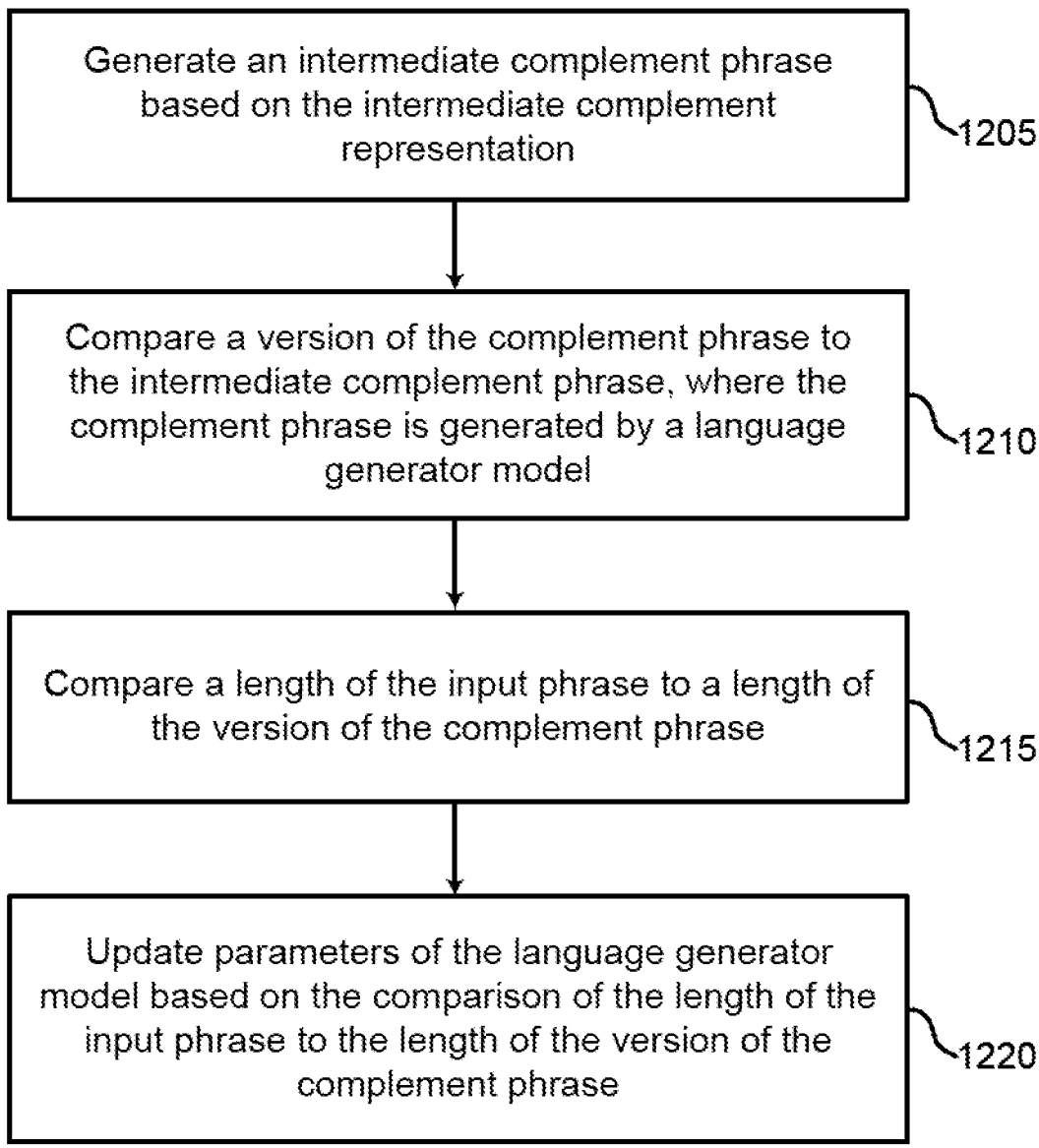
FIG. 12 shows an example of comparing a length of an input phrase to a length of a version of a complement phrase according to aspects of the present disclosure.

FIG. 12 shows an example of comparing a length of an input phrase to a length of a version of a complement phrase according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system generates an intermediate complement phrase based on the intermediate complement representation. In some cases, the operations of this step refer to, or may be performed by, training component as described with reference to FIG. 3.

At operation 1210, the system compares a version of the complement phrase to the intermediate complement phrase, where the complement phrase is generated by a language generator model. In some cases, the operations of this step refer to, or may be performed by, training component as described with reference to FIG. 3.

At operation 1215, the system compares a length of the input phrase to a length of the version of the complement phrase. In some cases, the operations of this step refer to, or may be performed by, training component as described with reference to FIG. 3. According to an embodiment, length penalty refers to using sum of the corresponding word embeddings of the original phrase and complement phrase for data augmentation. For example, the generated phrase S" should have same or substantially similar length as the original phrase S. Thus, length penalty is included in the reward: $R_{len}$=∥|S|−|S"|∥.

At operation 1220, the system updates parameters of the language generator model based on the comparison of the length of the input phrase to the length of the version of the complement phrase. In some cases, the operations of this step refer to, or may be performed by, training component as described with reference to FIG. 3.

Figure 13:
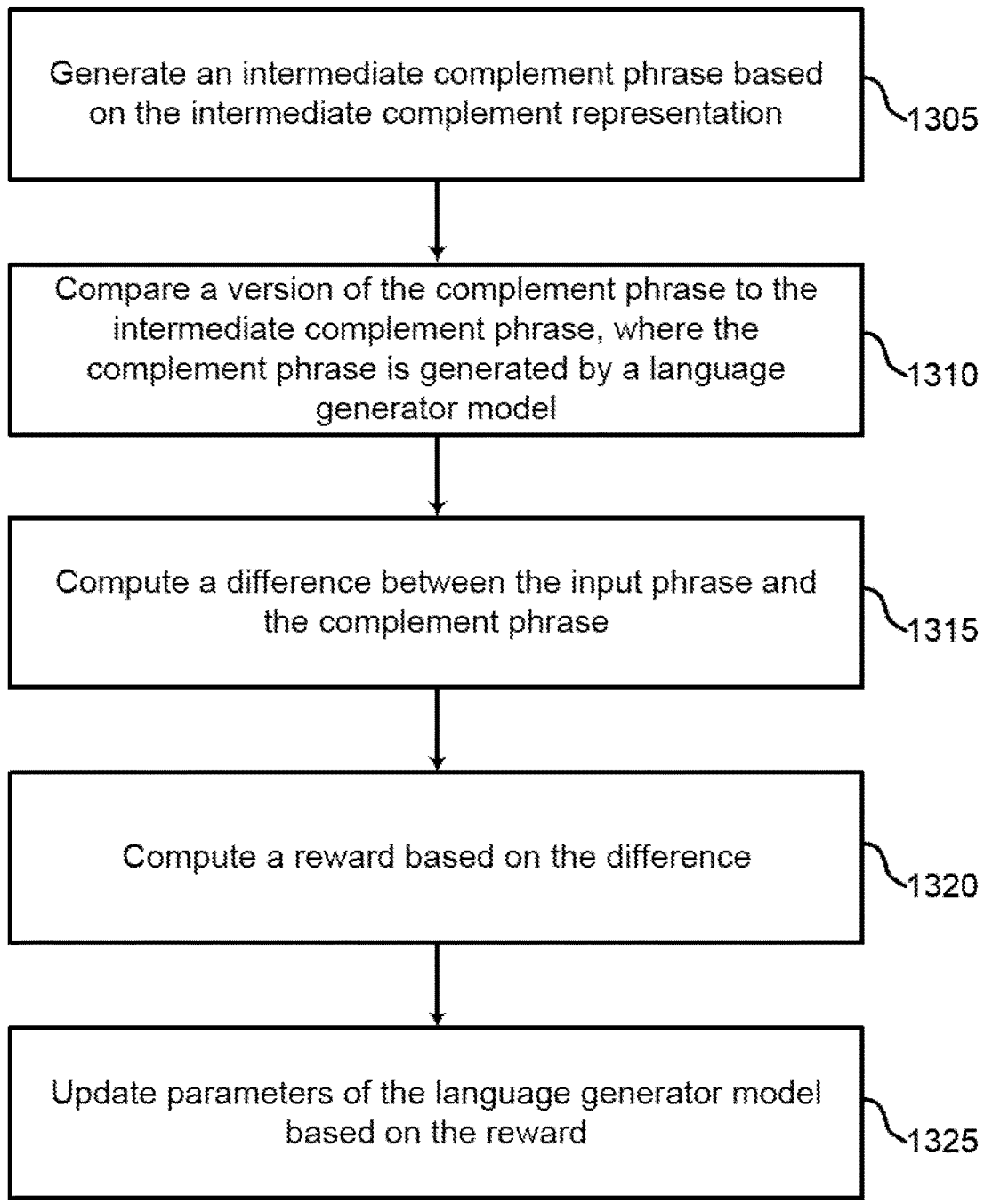
FIG. 13 shows an example of computing a reward based on a difference between an input phrase and a complement phrase according to aspects of the present disclosure.

FIG. 13 shows an example of computing a reward based on a difference between an input phrase and a complement phrase according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system generates an intermediate complement phrase based on the intermediate complement representation. In some cases, the operations of this step refer to, or may be performed by, training component as described with reference to FIG. 3.

At operation 1310, the system compares a version of the complement phrase to the intermediate complement phrase, where the complement phrase is generated by a language generator model. In some cases, the operations of this step refer to, or may be performed by, training component as described with reference to FIG. 3.

At operation 1315, the system computes a difference between the input phrase and the complement phrase. In some cases, the operations of this step refer to, or may be performed by, training component as described with reference to FIG. 3. The training component increases difference with original sentence such that semantic difference between the generated phrase S" and the original phrase S (for complementary information) are increased. This is similar to embedding regularization $\mathcal{L}_{reg}$ for complement embeddings described above. In an embodiment, each sentence/phrase is represented using the max-pooled representation of the corresponding word embeddings obtained from the GloVe embedding table, i.e., $\hat{R}_S$ and $\hat{R}_{S''}$.

At operation 1320, the system computes a reward based on the difference. In some cases, the operations of this step refer to, or may be performed by, training component as described with reference to FIG. 3. The dot-product of the word embeddings is used for the difference reward $R_{diff}=\hat{R}_S \odot \hat{R}_{S''}$. The overall reward to train the language generator model is formulated as $R(S'')=R_{sim}-\beta R_{len}-\gamma R_{diff}$. The training component minimizes the negative expected reward R (S") using a reinforcement algorithm (e.g., REINFORCE) over the possible choices of S": $\mathcal{L}_{tune}=-\mathbb{E}_{\hat{S}''\sim P(\hat{S}''|S)}[R(\hat{S}'')]$. The policy gradient is estimated by: $\nabla\mathcal{L}_{tune}=-\mathbb{E}_{\hat{S}''\sim P(\hat{S}''|S)}[(R(\hat{S}'')-b)\nabla \log P(\hat{S}''|S)]$. $\nabla\mathcal{L}_{tune}$ is estimated using one roll-out sample via the generated phrase S": $\nabla\mathcal{L}_{tune}=-(R(S'')-b)\nabla \log P(\hat{S}''|S)$ where b is the baseline to reduce variance. In some cases, the baseline b is obtained via:

$$b = \frac{1}{|B|}\sum_{i=1}^{|B|} R(S_i'')$$

|B| is the mini-batch size and $S_i''$ is the generated phrase (i.e., the complement phrase) for the i-th sample in the mini-batch.

At operation 1325, the system updates parameters of the language generator model based on the reward. In some cases, the operations of this step refer to, or may be performed by, training component as described with reference to FIG. 3.

According to some embodiments, a pre-trained generative model (e.g., GPT-2) is used for ATEOA since the generative model can provide language priors to support the sentence generation learning from limited training datasets for aspect term extraction tasks. An embodiment of the disclosure includes alterations to the generative language model to increase performance of the model. In some examples, the performance of three different models, i.e., GPT-2, T5, and BART are compared. For example, GPT-2 is a transformer-based model pre-trained on a web text corpus. In some cases, a small version of the corpus is evaluated with 117 million parameters. Similarly, T5 is a language model that includes encoder-decoder architecture in transformer for sequence-to-sequence tasks. In some examples, the base version has 220 million parameters. The input phrase S is the source sequence and the intermediate complement phrase S' is used as the target sequence to fine-tune the T5 model. Additionally, BART model is a transformer-based auto-encoder language model. In some examples, base version has 139 million parameters. BART is a sequence-to-sequence generative model that is fine-tuned by treating S and S' as the source and target sequences, respectively. In some cases, the terms "input phrase" and "input sentence" are used interchangeably. "Complement phrase" and "complement sentence" are also used interchangeably.

The performance of the three language generator models is compared and results are recorded. The language models are also compared on their ability to generate sentences that are similar to the complement sentences S'. In some examples, Lap14 dataset is used to find a complement sentence S' for each sentence in the test data portion with the proposed method. In some cases, a base model is first trained on the training data; the complement representations X' are then computed for each sentence in the test data; each complement representation X' is then mapped into complement sentence S' with the GloVe embeddings. In some examples, S' serves as the ground-truth complement sentence for the test sentences. Next, the fine-tuned language generator model is used to generate complement sentence S" for each test sentence (i.e., prompting the language generator model with test data). Finally, the similarity of generated sentence S" and ground-truth complement sentence S' is evaluated for the test data. For example, evaluation is implemented using ROUGE-1, ROUGE-2, METEOR, and BLUE4 as the similarity metrics. In some examples, GPT-2 generates better complement sentences to augment datasets for ATE tasks (i.e., yielding better performance for ATE and generating more similar sentences to the obtained complement sentences S').

Performance evaluation for the sentiment analysis apparatus of the present disclosure is conducted on tail aspect terms. In some cases, evaluation is performed on tail aspect terms in test data, i.e., aspect terms occurring less than 5 times in the training set. For example, performance of the aspect term extraction apparatus is compared with existing systems, i.e., DE-CNN and SoftProto. In some cases, contextualized BERT representations (i.e., X) in the sentiment analysis apparatus are replaced with GloVe embeddings for comparison. The sentiment analysis apparatus (e.g., aspect term extraction model with optimal augmentation) model can efficiently recognize tail aspect terms.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for natural language processing, comprising:
receiving an input phrase including an aspect term;
generating, using a language generator model, a complement phrase including the aspect term based on the input phrase, wherein the complement phrase includes different words than the input phrase that represent complementary information from the input phrase based on a regularization loss that minimizes a similarity between the input phrase and the complement phrase based on a dot product between representation vectors;

combining the input phrase and the complement phrase into a word embedding model to obtain an augmented representation of the input phrase by encoding the input phrase and the complement phrase to obtain an input representation and a complement representation, respectively, in a vector embedding space and combining the input representation and the complement representation to obtain the augmented representation; and generating sentiment information corresponding to the aspect term based on the augmented representation.

2. The method of claim 1, further comprising:
generating a contextualized word embedding for each word of the input phrase, wherein the input representation includes the contextualized word embedding.

3. The method of claim 2, further comprising:
computing a non-contextualized word embedding for each word of the complement phrase; and
mapping the non-contextualized word embedding to an embedding space of the contextualized word embedding, wherein the complement representation includes the mapping of the non-contextualized word embedding.

4. The method of claim 1, further comprising:
applying a sequential encoder to the augmented representation to obtain a hidden representation of the input phrase; and
applying a classification layer to the hidden representation to classify each word of the input phrase, wherein the sentiment information is based on the classification of each word of the input phrase.

5. The method of claim 1, wherein:
the sentiment information includes location information for the aspect term in the input phrase.

6. The method of claim 1, further comprising:
predicting a sentiment of the input phrase toward the aspect term.

7. A method for training a neural network, comprising:
training an aspect term extraction model using a training set comprising an input phrase and ground truth sentiment information for the input phrase, wherein the input phrase includes an aspect term;
generating, using a language generator model, a complement phrase including the aspect term based on the input phrase and based at least in part on an output of the aspect term extraction model, wherein the complement phrase includes different words than the input phrase that represent complementary information from the input phrase based on a regularization loss that minimizes a similarity between the input phrase and the complement phrase based on a dot product between representation vectors;
combining the input phrase and the complement phrase into a word embedding model to obtain an augmented representation of the input phrase by encoding the input phrase and the complement phrase to obtain an input representation and a complement representation, respectively, in a vector embedding space and combining the input representation and the complement representation to obtain the augmented representation; and
updating parameters of the aspect term extraction model based on the augmented representation.

8. The method of claim 7, further comprising:
identifying an intermediate complement representation based on the input phrase;
combining the input representation with the intermediate complement representation to obtain a combined intermediate representation of the input phrase;
predicting sentiment information based on the combined intermediate representation using the aspect term extraction model;
comparing the sentiment information to the ground truth sentiment information; and
updating the intermediate complement representation based on the comparison.

9. The method of claim 8, further comprising:
computing a similarity between the input representation and the intermediate complement representation, wherein the intermediate complement representation is updated to minimize the similarity.

10. The method of claim 8, further comprising:
mapping each element of the intermediate complement representation into a word embedding space;
selecting a closest word for each element of the intermediate complement representation based on the mapping; and
computing a distance between the closest word and a corresponding element of the intermediate complement representation, wherein the intermediate complement representation is updated to minimize the distance.

11. The method of claim 8, further comprising:
generating an intermediate complement phrase based on the intermediate complement representation;
comparing a version of the complement phrase to the intermediate complement phrase; and
updating parameters of the language generator model based on the comparison, wherein the complement phrase is generated by the language generator model.

12. The method of claim 11, further comprising:
mapping each element of the intermediate complement representation into a word embedding space; and
selecting a closest word for each element of the intermediate complement representation based on the mapping, wherein the intermediate complement phrase comprises the closest word for each element of the intermediate complement representation.

13. The method of claim 11, further comprising:
comparing a length of the input phrase to a length of the version of the complement phrase, wherein the parameters of the language generator model are updated based on the comparison of the length of the input phrase to the length of the version of the complement phrase.

14. The method of claim 11, further comprising:
computing a difference between the input phrase and the complement phrase; and
computing a reward based on the difference, wherein the parameters of the language generator model are updated based on the reward.

15. The method of claim 8, further comprising:
identifying a tradeoff parameter, wherein the combined intermediate representation and the augmented representation are formed based on the tradeoff parameter.

16. The method of claim 7, further comprising:
classifying each word of the input phrase using the aspect term extraction model to obtain predicted sentiment information;
comparing the predicted sentiment information to the ground truth sentiment information; and
updating the parameters of the aspect term extraction model based on the comparison.

17. The method of claim 7, further comprising:
computing a word embedding for each word of the complement phrase, wherein the complement representation includes the word embedding.

18. An apparatus for natural language processing, comprising:
a language generator model configured to generate a complement phrase including an aspect term based on an input phrase comprising the aspect term, wherein the complement phrase includes different words than the input phrase that represent complementary information from the input phrase based on a regularization loss that minimizes a similarity between the input phrase and the complement phrase based on a dot product between representation vectors; and
an aspect term extraction model configured to combine the input phrase and the complement phrase into a word embedding model to obtain an augmented representation of the input phrase by encoding the input phrase and the complement phrase to obtain an input representation and a complement representation, respectively, in a vector embedding space, and generate sentiment information corresponding to the aspect term in the input phrase based on the input representation and the complement representation, wherein the aspect term extraction model includes the word embedding model, a sequential encoder, and a classification layer.

19. The apparatus of claim 18, wherein:
the aspect term extraction model is configured to combine the input representation and the complement representation to obtain the augmented representation, and wherein the sentiment information is generated based on the augmented representation.

20. The apparatus of claim 18, further comprising:
a training component configured to train the language generator model to generate the complement phrase and to train the aspect term extraction model based on the trained language generator model.

* * * * *